United States Patent
Tsang

(10) Patent No.: US 8,854,424 B2
(45) Date of Patent: Oct. 7, 2014

(54) GENERATING AN AERIAL DISPLAY OF THREE-DIMENSIONAL IMAGES FROM A SINGLE TWO-DIMENSIONAL IMAGE OR A SEQUENCE OF TWO-DIMENSIONAL IMAGES

(75) Inventor: Peter Wai Ming Tsang, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 264 days.

(21) Appl. No.: 13/155,634

(22) Filed: Jun. 8, 2011

(65) Prior Publication Data
US 2012/0314021 A1    Dec. 13, 2012

(51) Int. Cl.
- *H04N 5/89* (2006.01)
- *G03H 1/22* (2006.01)
- *G06K 9/00* (2006.01)
- *G03H 1/02* (2006.01)
- *G02B 27/22* (2006.01)

(52) U.S. Cl.
CPC ............ *G03H 1/2294* (2013.01); *H04N 5/89* (2013.01); *G06K 9/00* (2013.01); *G03H 1/02* (2013.01); *G02B 27/22* (2013.01); *G02B 27/2292* (2013.01); *G03H 2001/0204* (2013.01); *G03H 2210/42* (2013.01); *G03H 2210/441* (2013.01)
USPC .......................................... 348/40; 382/154

(58) Field of Classification Search
CPC ............ G04K 9/00; H04N 5/89; G02B 5/32; G02B 17/14; G02B 27/22
USPC ........ 348/40, E13.026, 115; 359/15, 630, 13, 359/599; 345/7, 419; 382/154
See application file for complete search history.

(56) References Cited

U.S. PATENT DOCUMENTS

| | | |
|---|---|---|
| 5,745,197 A | 4/1998 | Leung et al. |
| 5,991,073 A | 11/1999 | Woodgate et al. |
| 6,817,716 B1 | 11/2004 | Hines |
| 7,492,523 B2 | 2/2009 | Dolgoff |
| 7,537,345 B2 | 5/2009 | Refai et al. |
| 7,568,803 B2 | 8/2009 | Vrachan et al. |

(Continued)

OTHER PUBLICATIONS

"Image Morphing: a Survey", George Wolberg, Department of Computer Science, CUNY, New York, NY 10031, 1998.*

(Continued)

*Primary Examiner* — Dave Czekaj
*Assistant Examiner* — Dramos I Kalapodas
(74) *Attorney, Agent, or Firm* — Amin, Turocy & Watson, LLP

(57) ABSTRACT

Systems, methods, and devices that generate and display a multiple view 3-D holographic image ("image") of a 3-D real or synthetic scene are presented. A capture system can capture or generate as little as a single 2-D image, or a sequence of 2-D images, of a scene and can convert the 2-D visual information to facilitate generating a 3-D scene from various perspectives. Predefined distortion morphing or transition morphing is employed to generate one or more morphing images to reconstruct different perspectives of the scene without having to capture such different perspectives. A sequence of 2-D images, including the morphing images, each representing a respective view of the scene are integrated to form a 3-D integrated image, which can be displayed on a 3-D aerial projection system. The disclosed subject matter can generate and/or maintain disparity information to improve quality of the display of the 3-D integrated image.

26 Claims, 24 Drawing Sheets

(56) References Cited

U.S. PATENT DOCUMENTS

| | | | | |
|---|---|---|---|---|
| 7,646,540 | B2* | 1/2010 | Dolgoff | 359/630 |
| 2002/0105514 | A1* | 8/2002 | Roche, Jr. | 345/419 |
| 2002/0191841 | A1* | 12/2002 | Harman | 382/154 |
| 2005/0018308 | A1 | 1/2005 | Cassarly et al. | |
| 2005/0270645 | A1 | 12/2005 | Cossairt et al. | |
| 2006/0171008 | A1* | 8/2006 | Mintz et al. | 359/15 |
| 2008/0012850 | A1 | 1/2008 | Keating III | |
| 2011/0216160 | A1* | 9/2011 | Martin | 348/40 |

OTHER PUBLICATIONS

"Image-Based Modeling, Rendering, and Lighting", Paul Debevec, SIGGRAPH 2000Course 35.*

Office Action dated Aug. 15, 2012 for U.S. Appl. No. 12/756,644, 28 pages.

Lugmayr, "Vizoo Cheoptics360 XL Amazing Holographic Display," Oct. 10, 2006, http://www.i4u.com/article6786.html.

Shenzhen Fantasy Sky digital Technology Co., Ltd. "Holography360," accessed Apr. 8, 2010, http://www.szhtsm.cn.

Jones et al., "Rendering for an Interactive 360° Light Field Display", Siggraph, 2007, http://gl.ict.usc.edu/Research/3DDisplay.

http://www.youtube.com/watch?v=PguNPIXfnOs.

Office Action dated Jan. 24, 2013 for U.S. Appl. No. 12/756,644, 22 pages.

Office Action dated Jan. 24, 2014 for U.S. Appl. No. 12/756,644, 32 pages.

Office Action dated Sep. 13, 2013 for U.S. Appl. No. 12/756,644, 25 pages.

Office Action dated Aug. 6, 2014 for U.S. Appl. No. 12/756,644, 28 pages.

* cited by examiner

GENERATING AN AERIAL DISPLAY OF THREE-DIMENSIONAL IMAGES FROM A SINGLE TWO-DIMENSIONAL IMAGE OR A SEQUENCE OF TWO-DIMENSIONAL IMAGES

TECHNICAL FIELD

The subject disclosure relates generally to displaying multi-dimensional images, and in particular, to generating an aerial display of three-dimensional images from a single two-dimensional image or a sequence of two-dimensional images.

BACKGROUND

Since the appearance of the Princess Leia holographic message in the 1970's Star War movie, researchers have been exploring the feasibility of producing a real world prototype. Recently, similar excitement has been stirred up in the community with the "Three Dimensional (3-D) forensic chamber" in the television series "Bones". The closest systems that have been built so far are the Cheoptic-360 and the Holography-360, which allows a Two Dimensional (2-D) object scene to be floated in mid-air and observed by viewers from the four sides. However, it is simply the projection of a 2-D planar image, and there is no depth or disparity information as in the original object scene. To create the 3-D illusion, the scene (or the object(s) in the scene) on each side is/are rotated continuously.

Generation of a floating image can be achieved with aerial projection. To generate a floating image, a real object is placed in an area which is generally not visible to the viewer. When illuminated, an image of the object is reflected by a beam-splitter and observable as a virtual image by the viewer, creating the impression of the object image floating in air. A background image, or a concave mirror, is sometimes added to enhance the effect. One of the significant disadvantages of this approach is the requirement of a real object.

Another method has been employed to remove the need of a real object, wherein a 2-D image of the real object is captured by a camera, and reproduced with certain display device such as a cathode ray tube (CRT) monitor, liquid crystal display (LCD) monitor, or an optical projector. The image produced by the display device is reflected by a beam-splitter and projected to the viewer as a virtual, floating image. Similarly, a background image or a concave mirror is sometimes used to provide the illusion of a 3-D effect.

The above methods and systems only provide viewers the ability to observe the floating image from a single direction. An existing product known as the "HoloCube 3D Projection Box" is based on similar principles. Recently, this has been extended to integrate two or more such aerial projection units, each projecting a floating image independently along a unique direction. The directions of projection are generally two or more of the following: front, left, right, back. An advantage of this approach is that viewers can observe the projected image from an aerial projection unit, as well as the environment behind the aerial projection unit. In this product, there is no background device or mirrors to block the sight of the viewer. Such concept has been adopted in the Cheoptic-360 system and the Holography-360 system. However, with these systems, the floating image lacks the 3-D information, such as the depth perception, and parallax is absent as the observers move their viewing positions with respect to the displayed image.

Some other conventional hologram display approaches include the foreground/background approach (e.g., as found in Dolgoff, U.S. Pat. No. 7,492,523, "Method for displaying a three-dimensional scene"), the multi-layer display (e.g., as found in Leung et al., U.S. Pat. No. 5,745,197, "Three-dimensional real-image volumetric display system and method", Refai et al., U.S. Pat. No. 7,537,345, "Volumetric liquid crystal display for rendering a three-dimensional image"), and the spinning mirror (e.g., Jones et al., "Rendering for an Interactive 360° Light Field Display", Siggraph, 2007).

These conventional hologram display approaches have a number of deficiencies. For instance, conventional holographic display systems that generate holographic images of a 3-D real scene require multiple optical signals from multiple optical cameras continuously capturing the respective views of the scene in order to generate recreate the scene as a holographic image. Such multi-camera arrangement can be expensive, complicated and tedious to undertake, and relatively inefficient. Also, holograms projected using conventional approaches lack depth perception and parallax information (e.g., disparity information).

Today, there is no efficient, economical, less complex way to capture visual information of a 3-D object scene. Further, currently there is no way to generate, maintain, or display disparity information of an original 3-D object scene. The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the innovations in order to provide a basic understanding of some aspects described herein. This summary is not an extensive overview of the disclosed subject matter. It is intended to neither identify key or critical elements of the disclosed subject matter nor delineate the scope of the subject innovations. Its sole purpose is to present some concepts of the disclosed subject matter in a simplified form as a prelude to the more detailed description that is presented later.

The disclosed subject matter includes, systems, methods, devices, and other technologies that can generate and display a multiple view three-dimensional (3-D) holographic image ("image") of a 3-D real or synthetic scene. In an aspect, a capture system can capture or generate (e.g., synthetically generate) as little as a single two-dimensional (2-D) image, or a sequence of 2-D images, of a real or synthesized (e.g., computer generated) 3-D object scene and can convert the 2-D visual information associated with the 2-D image(s) to facilitate generating a 3-D integrated image comprising various perspectives of a 3-D object scene.

In accordance with various aspects, a predefined distortion morphing or transition morphing can be employed to generate one or more 2-D morphing images, based at least in part on the captured or generated 2-D image(s), to reconstruct different perspectives of the 3-D object scene without having to capture such different perspectives. A sequence of 2-D images, including the generated 2-D morphing images, each representing a respective view of a portion (e.g., a frame or 3-D image) of the 3-D object scene can be integrated to form a 3-D integrated image of the 3-D object scene.

The 3-D integrated image or sequence of 3-D integrated images can be provided (e.g., transmitted) to a display component (e.g., autostereoscopic display, a multiple view autostereoscopic display), and the display component can display the 3-D integrated image or sequence of 3-D integrated images (e.g., aerially). For instance, the disclosed subject matter can allow the single 3-D integrated image or sequence of 3-D integrated images to be displayed as a static or an animated multiple-view autostereoscopic 3-D image(s), which can be perceived, by the viewer, to be floating in the viewing space associated with the display component, even when the object(s) in the scene is/are stationary. Further, the disclosed subject matter can generate and/or maintain disparity information to improve quality of the display of the 3-D integrated image(s), and, in the case of animation, the depth perception is further strengthened (e.g., improved) with the motion of the constituting object(s) of the reconstructed 3-D object scene.

In an aspect, the disclosed subject matter can include a system, comprising an image generator component configured to generate a 2-D morphed image of a section of a 3-D object scene based at in part on at least one 2-D image of at least a first perspective of the section of the 3-D object scene, wherein the 2-D morphed image is from a different perspective of the section of the 3-D object scene. The system can further comprise a render component configured to integrate at least the 2-D morphed image and the at least one 2-D image to generate an integrated 3-D holographic image of the section of the 3-D object scene.

In another aspect, the disclosed subject matter can include a method, comprising the act of generating at least one two-dimensional (2-D) morphed image of at least one specified perspective of a segment of a three-dimensional (3-D) object scene based at least in part on at least one 2-D image having at least one other perspective of the segment of the 3-D object scene. The method can further include the act of integrating the at least one 2-D image and the at least one 2-D morphed image to generate an integrated 3-D holographic scene image comprising the at least the one specified perspective and the at least one other perspective of the segment of the 3-D object scene.

In still another aspect, the disclosed subject matter can include a system, comprising means for producing a two-dimensional (2-D) morphed image of a specified viewpoint of a frame of a three-dimensional (3-D) object scene based at least in part on at least one 2-D image of at least one other viewpoint of the frame of the 3-D object scene. The system can further comprise means for integrating the at least one 2-D image and the at least one 2-D morphed image to generate an integrated 3-D holographic scene image comprising the viewpoint and the at least one other viewpoint of the frame of the 3-D object scene.

In still another aspect, the disclosed subject matter can include a computer readable storage medium comprising computer executable instructions that, in response to execution by a computing system, cause the computing system to perform operations comprising: generating a 2-D morphed image of a specified view of a section of a 3-D object scene based at least in part on at least one 2-D image of at least one other view of the section of the 3-D object scene; and combining the at least one 2-D image and the at least one 2-D morphed image to generate an integrated 3-D holographic scene image comprising the view and the at least one other view of the segment of the 3-D object scene.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
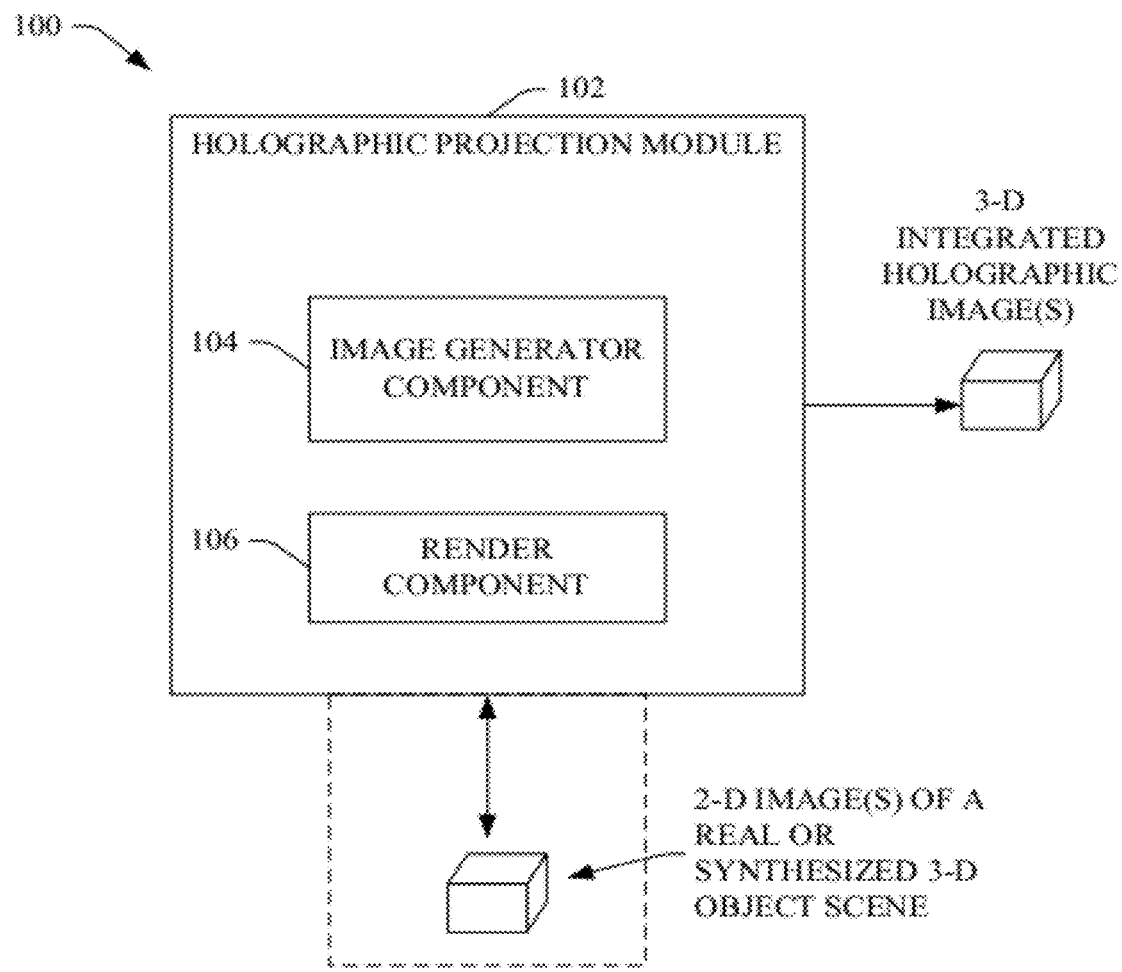
FIG. 1 illustrates a block diagram of an example system that can generate one or more multiple-view three-dimensional (3-D) integrated images of a 3-D object scene in accordance with various embodiments and aspects of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

These conventional hologram display approaches have a number of deficiencies. For instance, conventional holographic display systems that generate holographic images of a 3-D real scene require multiple optical signals from multiple optical cameras continuously capturing the respective views of the scene in order to generate recreate the scene as a holographic image. Such multi-camera arrangement can be expensive, complicated and tedious to undertake, and relatively inefficient. Also, holograms projected using conventional approaches lack depth perception and parallax information (e.g., disparity information). Today, there is no efficient, economical, less complex way to capture visual information of a 3-D object scene. Further, currently there is no way to generate, maintain, or display disparity information of an original 3-D object scene.

Conventionally, projections systems have been able to display a two-dimensional (2-D) image of a scene as if floating in mid-air, where a background image or concave mirror is employed to help simulate or enhance a three-dimensional (3-D) effect for the image. In addition to only displaying a 2-D image, another disadvantage of such conventional projection systems is that they require a real object be used for the scene. Other conventional projection systems have integrated two or more aerial projection units, each projecting a floating image independently along a unique direction. This can allow viewers to observe the projected image from an aerial projection unit as well as the environment behind the aerial projection unit. However, the floating image displayed by these conventional systems lacks desired 3-D information, such as depth perception, and parallax is absent as the viewers move their viewing positions with respect to the image. It is desirable to be able to efficiently generate and display a 3-D holographic image of a 3-D real or synthetic scene that preserves desired 3-D information, such as depth perception and parallax.

To that end, presented are systems, methods, devices, and other technologies that can generate and display a multiple view three-dimensional (3-D) holographic image ("image") of a 3-D real or synthetic scene. In an aspect, a capture system can capture or generate (e.g., synthetically generate) as little as a single two-dimensional (2-D) image, or a sequence of 2-D images, of a real or synthesized (e.g., computer generated) 3-D object scene and can convert the 2-D visual information associated with the 2-D image(s) to facilitate generating a 3-D integrated image comprising various perspectives of a 3-D object scene.

In accordance with various aspects, a predefined distortion morphing or transition morphing can be employed to generate one or more 2-D morphing images, based at least in part on the captured or generated 2-D image(s), to reconstruct different perspectives of the 3-D object scene without having to capture such different perspectives. A sequence of 2-D images, including the generated 2-D morphing images, each representing a respective view of a portion (e.g., a frame, a moment in time, a section, a segment) of the 3-D object scene can be integrated to form a 3-D integrated image of the 3-D object scene.

The 3-D integrated image or sequence of 3-D integrated images can be provided (e.g., transmitted) to a display component (e.g., autostereoscopic display, a multiple view autostereoscopic display), and the display component can display the 3-D integrated image or sequence of 3-D integrated images (e.g., aerially). For instance, the disclosed subject matter can allow the single 3-D integrated image or sequence of 3-D integrated images to be displayed as a static or an animated multiple-view autostereoscopic 3-D image(s), which can be perceived, by the viewer, to be floating in the viewing space associated with the display component, even when the object(s) in the scene is/are stationary. Further, the disclosed subject matter can generate and/or maintain disparity information to improve quality of the display of the 3-D integrated image(s), and, in the case of animation, the depth perception is further strengthened (e.g., improved) with the motion of the constituting object(s) of the reconstructed 3-D object scene.

FIG. 1 illustrates a block diagram of an example system 100 that can generate one or more multiple-view 3-D integrated images of a 3-D object scene in accordance with various embodiments and aspects of the disclosed subject matter. In an embodiment, the system 100 can be a multiple-view aerial holographic projection system (MVAHPS) that can generate and display a 3-D holographic image of a 3-D real or synthetic, static or animated, object scene viewable from multiple perspectives (e.g., multiple angles in relation to the 3-D object scene), wherein the 3-D holographic image can be viewed, for example, as a 3-D image floating in mid-air in a desired display area (e.g., 3-D chamber), as more fully disclosed herein. The system 100 can comprise a holographic projection module (HPM) 102 (or multiple HPMs 102) that can receive, or generate (at least initially), one 2-D image, or a sequence of 2-D images, of a real or synthesized, static or animated, 3-D object scene, and can generate a 3-D integrated image (e.g., 3-D integrated holographic image), or a sequence of 3-D integrated images, which can be provided for display (e.g., aerially) and viewing, as more fully disclosed herein.

In an aspect, the holographic projection module (HPM) 102 can include an image generator component 104 that can convert a 2-D image(s) of a 3-D object scene into a 3-D holographic image(s) that represents or reconstructs the 3-D object scene. The image generator component 104 can generate one or more 2-D images, such as 2-D morphed images, based at least in part on a 2-D image(s) of a portion (e.g., a frame, a moment in time, a section, a segment) of a 3-D object scene, wherein the 2-D image or 2-D images can be of a respective view or views of the 3-D object scene (e.g., perspective(s) or angle(s) in relation to the 3-D object scene), and the 2-D morphed image or 2-D morphed images can be of other respective views (e.g., 2-D views) of the 3-D object scene that were not captured, for example, by a camera (or initially generated as part of a synthesized 3-D object scene) by the HPM 102. As desired, a 2-D morphed image(s) can be generated for each 2-D image(s) of each frame of video content of the 3-D object scene.

In one aspect, the image generator component 104 can receive and use as little as a single 2-D image (or, if desired a sequence of 2-D images) of a first perspective of a 3-D object scene to generate a desired number of 2-D morphed images of various other perspectives of the 3-D object scene, and convert the single 2-D image (or, if desired a sequence of 2-D images) of the first perspective of the object scene into an animated sequence of multi-view, 3-D holographic images (e.g., multi-view autostereoscopic images) of the 3-D object scene that can be viewed from various perspectives. For instance, the image generator component 104, using the single 2-D image of the first perspective of a segment of the 3-D object scene, can generate a plurality of 2-D morphed images constructing various perspectives of the 3-D object scene, wherein the single 2-D image and the plurality of 2-D morphed images can be integrated to generate an animated sequence of integrated 3-D holographic images of the 3-D object scene. In still another aspect, not only can the image generator component 104 generate 2-D morphed images of various perspectives of a segment of the 3-D object scene based at least in part on the single 2-D image of the segment of the 3-D object scene, but the image generator component 104 also can generate 2-D morphed images temporally to, for example, to construct 2-D morphed images depicting movement of an object(s) in the 3-D object scene over time to generate the animated sequence of integrated 3-D holographic images of a plurality of segments of the 3-D object scene from various perspectives of the 3-D object scene over time based at least in part on the single 2-D image of the first perspective of the segment of the 3-D object scene.

In accordance with various embodiments, the image generator component 104 can perform a distortion morphing technique (e.g., distortion morphing algorithm) on a 2-D image of one view (e.g., perspective, viewpoint) of a 3-D object scene to generate one or more 2-D morphed images of a different view(s) of the 3-D object scene, a transition morphing technique (e.g., transition morphing algorithm) to on a 2-D image of one view of a 3-D object scene to generate one or more 2-D morphed images of a different view(s) of the 3-D object scene, or a hybrid morphing technique (e.g., employing both the distortion morphing and transition morphing techniques) on a 2-D image of one view of a 3-D object scene to generate a plurality of 2-D morphed images of different views of the 3-D object scene, all as more fully disclosed herein. The 2-D image and the associated 2-D morphed images of N respective views of the 3-D object scene, wherein N can be an integer number that is 2 or greater, and, as desired, can provide a 360 degree view (or less than 360 degree) view of the 3-D object scene when reproduced and displayed as an integrated 3-D holographic image.

In another aspect, the HPM 102 can include a render component 106 that can receive the plurality of 2-D images, comprising the 2-D image and associated 2-D morphed images, from the image generator component 104, and can render the images to combine or integrate the plurality of images with each other to generate a 3-D integrated image (e.g., 3-D integrated holographic image), in accordance with a predefined image integrator technique (e.g., image integrator algorithm). This rendering by the render component 106 can be performed for each plurality of 2-D images for each portion (e.g., a frame, a moment in time, a section, a segment) of a sequence relating to a 3-D object scene, so that there can be a sequence of 3-D integrated images that represent respective portions of the 3-D object scene. The render component 106 can provide (e.g., present, transmit) the 3-D integrated image, or sequence of 3-D integrated images, as an output, wherein the 3-D integrated image, or sequence of 3-D integrated images, can be further processed for display (e.g., by an autostereoscopic display) as a static, or an animated, 3-D holographic image(s) (e.g., multi-view autostereoscopic 3-D image(s)), which can be perceived (e.g., by a viewer) to be floating (e.g., aerially) in a viewing space, as more fully disclosed herein. The 3-D holographic image(s) can be displayed in color or monochrome (e.g., black and white, sepia, cyanotype, etc.), as desired.

Further, the HPM 102 is able to generate and/or maintain the depth and disparity information (e.g., parallax information to recreate movement parallax) in the 3-D holographic image(s) to provide depth perception when viewed in relation to the image(s) even when the 3-D object(s) in the 3-D object scene is/are stationary. Furthermore, in the case of animation, the depth perception is further strengthened with the motion of the constituting 3-D object(s) of the 3-D object scene. Moreover, because the 3-D holographic image(s) comprises the depth and disparity information, when the 3-D holographic image(s) is displayed, an observer of the image(s) can move in relation to the 3-D holographic image (e.g., move eyes or head, and/or walk around the 3-D holographic image(s)) to view the 3-D holographic image(s) from different perspectives of the 3-D object scene.

In accordance with various embodiments, the HPM 102 can automatically generate, and/or the HPM 102 can be manually used to generate, the depth and disparity information and/or animation of a 3-D object scene. Moreover, the 3-D perception can be achieved and presented without the need of real objects, or optical signals from multiple cameras, as the source of the display, as in some conventional systems. Also, the disclosed subject matter can be significantly safer and more readily applicable in the real world, as compared to at least some conventional systems, such as holographic display systems that employ high power lasers.

The disclosed subject matter, by generating morphed images of different perspectives of a 3-D object scene, can more efficiently (e.g., with less complexity, time, and resources) and economically produce 3-D holographic images than conventional systems or methods, such as, for example, the aforementioned foreground/background approach, the multi-layer display, and the spinning mirror approach, as, in accordance with the disclosed subject matter, there can be a reduction in the amount of images (e.g., as little as one 2-D image) of a 3-D object scene that have to be captured in order to reproduce the 3-D object scene as a 3-D holographic image, and consequently less capture components (e.g., cameras) that have to be used than in conventional capture systems. As a result, there can be less expense (e.g., due to needing less cameras) and less complexity and time in capturing the scene, as it is no longer necessary to have multiple cameras precisely positioned at multiple perspectives in relation to the 3-D object scene.

Further, in accordance with various embodiments, all or at least a portion of the aspects of the disclosed subject matter, can be realized using legacy or commodity digital cameras (e.g., photographic or video cameras), electronics, and computing resources. As a result, the disclosed subject matter can be economical and relatively easily used by users, even if they only have a basic knowledge in computing.

The disclosed subject matter has a number of beneficial uses as well. For example, the disclosed subject matter can be utilized for 360 degree 3-D movie display; to present 3-D holographic advertisements (e.g., in a mall or other public area); to present 3-D holographic images as part of an attraction at a theme or amusement park, as part of an educational event, as part of a presentation in a conference or exhibition, in an information kiosk, in a photographic studio, as part of a theatre presentation or performance, as part of scientific and medical research, and/or in electronic toys or games (e.g., video games).

Figure 2:
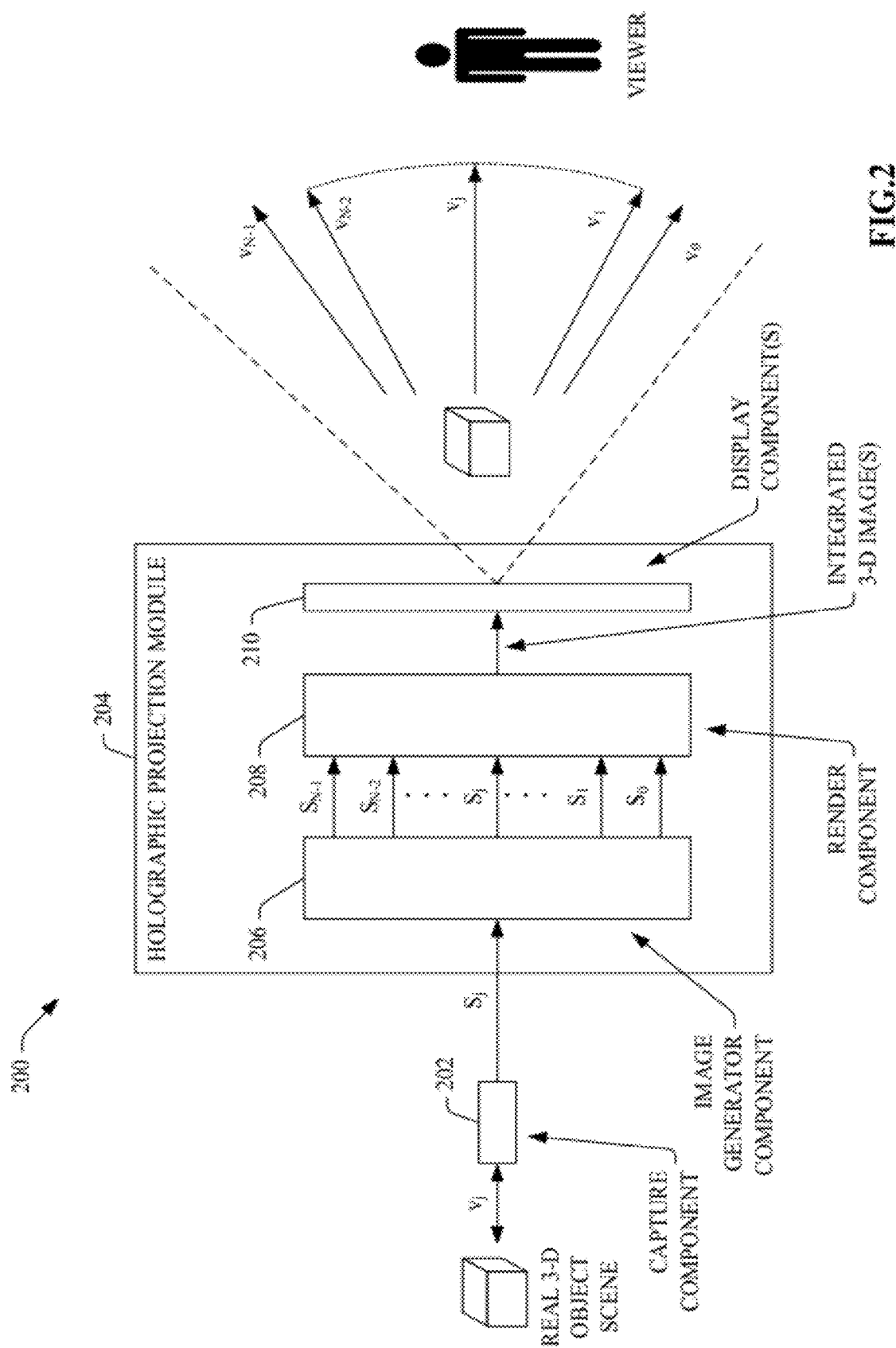
FIG. 2 depicts a diagram of a system that can capture one or more two-dimensional (2-D) images of a 3-D object scene (e.g., real 3-D object scene) in accordance with various aspects and embodiments of the disclosed subject matter.

Referring briefly to FIG. 2 (along with FIG. 1), depicted in FIG. 2 is a diagram of a system 200 that can capture one or more 2-D images of a 3-D object scene (e.g., real 3-D object scene) in accordance with various aspects and embodiments of the disclosed subject matter. In an aspect, the system 200 can include a capture component 202, such as a digital photographic or video camera, that can be utilized to capture one or more 2-D images of a 3-D object scene from a desired perspective (e.g., as little as one 2-D image of the 3-D object scene). It is to be appreciated and understood that, in accordance with another embodiment, the capture component 202 can be an analog photographic or video camera, to capture the one or more 2-D images, and the analog visual information relating to the one or more 2-D images can be converted to corresponding digital visual information using an analog-to-digital converter, as desired.

The capture component 202 can be communicatively connected to the HPM 204, and can provide (e.g., communicate, present, transmit) the visual information relating to the captured 2-D image(s) to the HPM 204 for processing to generate the 3-D holographic image(s) of the 3-D object scene, as more fully disclosed herein. For instance, the capture component 202 can capture one or more 2-D images of a view $v_j$ of the 3-D object scene, and can generate visual information $S_j$ corresponding to the one or more 2-D images, wherein the visual information $S_j$ can be provided to the HPM 204.

The HPM 204 can include an image generator component 206 that can analyze the visual information $S_j$ of the one or more 2-D images, and, for each 2-D image of the one or more images, the image generator component 206 can convert the 2-D image of view $v_j$ into a specified number of 2-D images having a corresponding specified number of different views, $S_0, S_1, \ldots, S_j, \ldots S_{N-2}, S_{N-1}$, of the 3-D object scene, as more fully disclosed herein. For example, for each 2-D image of the one or more images, the image generator component 204 can generate one or more 2-D morphed images (e.g., using a distortion morphing technique, a transition morphing technique, or a hybrid thereof) having respective different views, based at least in part on the analysis and processing of the 2-D image.

For each captured 2-D image of a 3-D object scene, for which a specified number of 2-D images, which have a corresponding specified number of different views, have been generated, the specified number of 2-D images can be presented by the image generator component 206 to the render component 208. The render component 208 can render the specified number of 2-D images to combine or integrate those 2-D images into a 3-D integrated image, comprising visual information relating to those 2-D images.

The 3-D integrated image can be further processed (e.g., to generate corresponding 3-D holographic model data), as more fully disclosed herein, and/or can be presented as an output to one or more display components, such as the display component 210 (e.g., autostereoscopic display). The display component 210 can process the 3-D integrated image, comprising visual information of the specified number of 2-D images of the 3-D object scene, to generate and display the respective 2-D images having the respective views, $v_0, v_1, \ldots v_j, \ldots v_{N-2}, v_{N-1}$, to present (e.g., aerially) a 3-D holographic image that reconstructs the 3-D object scene. While not shown in FIG. 2 (but as disclosed herein), the display component 210 can be structured and positioned to display the 3-D holographic image aerially and can further allow a viewer to walk around the display so that the viewer can observe the 3-D holographic image from different viewing perspectives.

It is to be appreciated and understood that the capture component 202, HPM 204, image generator component 206, render component 208, and display component 210, each can respectively be the same as or similar to, or can comprise the same or similar functionality as, respective components (e.g., respectively named components), as disclosed herein.

Figure 3:
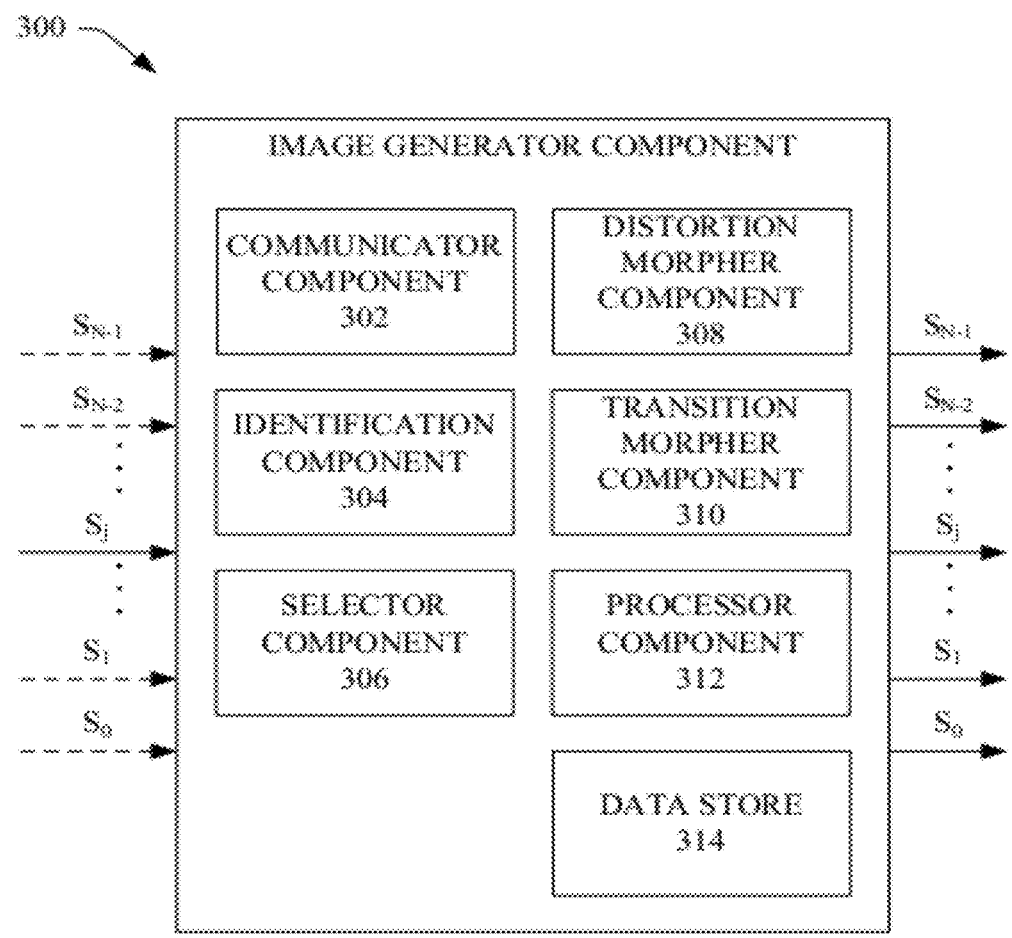
FIG. 3 illustrates a block diagram of an example image generator component, in accordance with various embodiments and aspects of the disclosed subject matter.

FIG. 3 is a block diagram of an example image generator component 300, in accordance with various embodiments and aspects of the disclosed subject matter. The image generator component 300 can receive as little as one 2-D image (e.g., $S_j$) of one perspective of a portion (e.g., frame, moment in time, section, segment) of a 3-D object scene and can generate one or more 2-D morphed images (e.g., $S_0, S_1, \ldots$ (except for at least $S_j$, which can be an actual 2-D image), $S_{N-2}, S_{N-1}$) of other perspectives of the portion of the 3-D object scene (and/or of other portions of the 3-D object scene), based at least in part on the one 2-D image, as more fully disclosed herein. It is noted that the 2-D images, $S_0, S_1, \ldots, S_{N-2}, S_{N-1}$ (other than $S_j$), which are being input to or received by the image generator component 300, are depicted in FIG. 3 with dotted lines because such 2-D images optionally can be captured or synthesized, and can be communicated to the image generator component 300, as desired, for processing or further use (e.g., to facilitate generating 2-D morphed images).

In an aspect, the image generator component 300 can include a communicator component 302 that can receive, such as visual information (e.g., one or more 2-D images) relating to a 3-D object scene, from a capture component or other component (e.g., computing component that has generated a synthesized 3-D image or scene, computing component that has performed another process on the visual information) associated with the image generator component 300. The communicator component 302 also can transmit information, such as visual information (e.g., a specified number of 2-D images, comprising one or more 2-D morphed images), to an associated component, such as a render component for further processing.

In an aspect, the image generator component 300 can include an identification component 304 that can be utilized to identify one or more types of morph points, including a fixed point, morph seed point, morph target point, or a transition point (e.g., primary transition point, corresponding transition point), wherein a specified morph point can be identified (e.g., automatically, dynamically, or manually (e.g., by a user)) for selection in relation to processing (e.g., generating a 2-D morphed image(s) relating to) visual information (e.g., a 2-D image of a 3-D object scene). In another aspect, the image generator component 300 can contain a selector component 306 that can select (e.g., automatically, dynamically, or manually (e.g., by a user)) one or more of the different types of morph points in relation to processing visual information (e.g., a 2-D image of a 3-D object scene).

For example, the identification component 304 can automatically identify one or more potential morph points based at least in part on an analysis of the 2-D image and application of a predefined morph-point-identification algorithm to the results of the analysis. The one or more potential morph points can be presented (e.g., shown on the 2-D image) to the user, wherein the user can accept (e.g., select) the one or more potential morph points as presented or can modify the one or more potential morph points and accept the modified subset of morph points.

Figure 4:
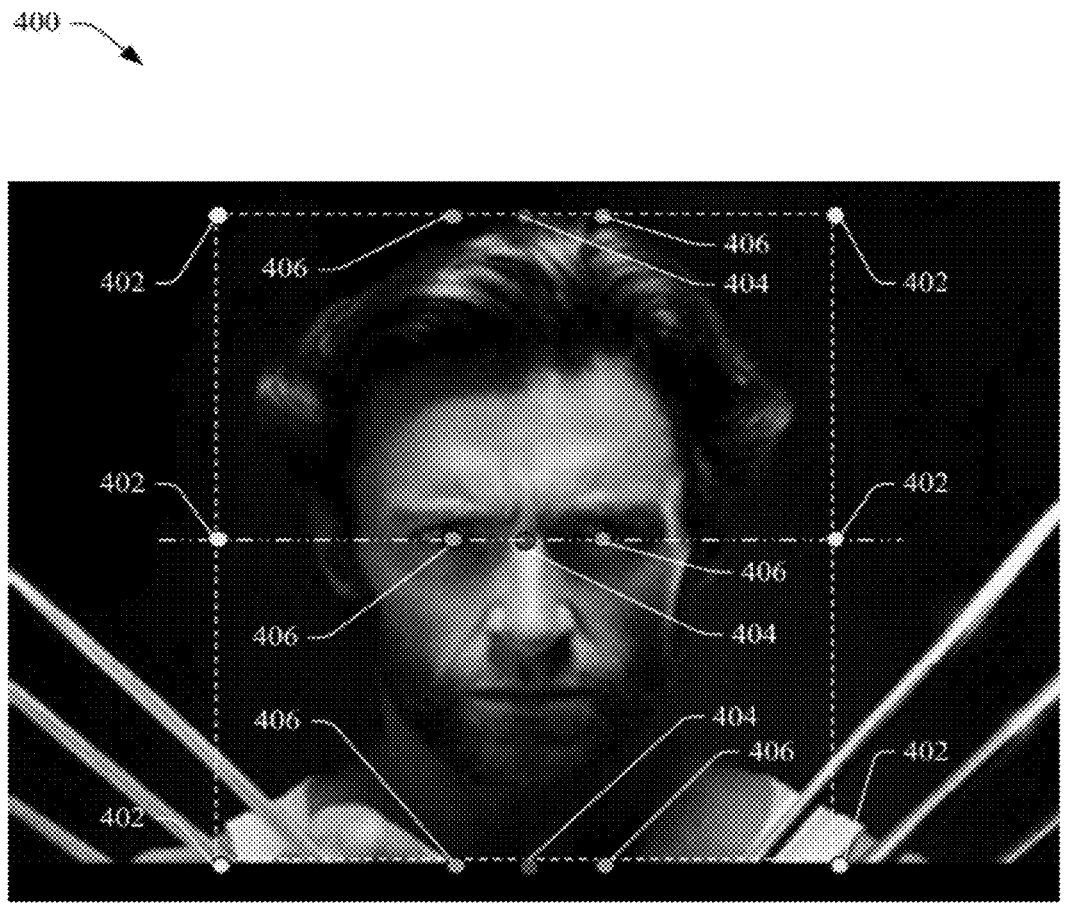
FIG. 4 depicts an example 2-D image that can be utilized to generate one or more 2-D morphed images, in accordance with various aspects and embodiments.
Figure 5:
FIG. 5 depicts example distortion morphing results relating to distortion morphing, in accordance with various aspects.

In an aspect, the image generator component 300 can include a distortion morpher component 308 that can employ a specified distortion morphing technique(s) to perform distortion morphing on a 2-D image of a particular view of a 3-D object scene to generate one or more 2-D morphed images of one or more respective different views of the 3-D object scene. Referring briefly to FIGS. 4 and 5 (along with FIG. 3), illustrated in FIG. 4 is an example 2-D image 400 that can be processed using the distortion morphing technique(s) to generate, for instance, the 2-D morphed images (e.g., 2-D distortion-morphed images) as shown in the example distortion morphing results 500 depicted in FIG. 5. With regard to the example 2-D image 400, a subset of fixed points 402 can be identified by the identification component 304 and selected by the selector component 306, both of which can be operating in conjunction with the distortion morpher component 308.

In another aspect, a specified number of morph seed points 404 can be identified by the identification component 304 and selected by the selector component 306. For example, the morph seed points 404 can be selected along an axis of rotation, as depicted, or differently selected (e.g., off-axis, along more than one axis of rotation), wherein the distortion morphing of an image can be varied based at least in part on the location of the morph seed points in relation to the image and morph target points (e.g., different assignment of morph points, such as a morph seed point, morph target point or fixed point, can create different morphing effects or results). Further, at least in certain instances, it can be desirable to select a morph seed point 404 in the center of the 2-D image 400.

In still another aspect, a specified number of morph target points 406 can be identified by the identification component 304 and selected by the selector component 306. For example, a morph target point 406 can be selected to be located a specified distance away from a corresponding morph seed point 404 and/or located at an item of interest (e.g., eye on a person's face) on the 2-D image 400. The specified distance between the morph seed point 404 and associated morph target point 406 can be identified based at least in part on the number of disparate views, and correspondingly the number of disparate 2-D morphed images, of the 3-D object scene to be generated, wherein the larger the number of disparate 2-D morphed images of the 3-D object scene to be generated, the shorter the distance between the morph seed point 404 and associated morph target point 406, and vice versa. The specified distance between the morph seed point 404 and associated morph target point 406 also or alternatively can be identified based at least in part on the portion (e.g., 360 degrees, less than 360 degrees) of the 3-D object scene to be reproduced.

In an aspect, the distortion morpher component 308 can associate (e.g., tag, link, connect) the morph target point 406 with its corresponding morph seed point 404 so that the distortion morpher component 308 can properly generate a 2-D morphed image(s) (e.g., from the perspective(s) $v_{j-1}$ and/or $v_{j+1}$) that is a 2-D depiction of the 3-D object scene from the target view perspective(s), based at least in part on the seed 2-D image 400 (e.g., from the perspective $v_j$) (e.g., example morphed image 504 (wherein the morphed image is a view wherein the person's face is turned slightly to the right in relation to the original image 502); example morphed image 506 (wherein the morphed image is a view wherein the person's face is turned slightly to the left in relation to the original image 502)).

In an aspect, in generating the 2-D morphed image (e.g., 504) from the target view perspective, the distortion morpher component 308 can modify geospatial characteristics of an object(s) in the 2-D seed image (e.g., relative geospatial locations of respective features of the object as the object is or would be perceived from respective perspectives) and/or optical (e.g., visual) or structural characteristics in the object(s) (e.g., relative and respective shapes, sizes, textures, colors, illumination, shading, depth, etc., of respective features of the object as the object is or would be perceived from respective perspectives) from how such characteristics appear in the 2-D seed image 400 to generate modified geospatial characteristics and/or optical (e.g., visual) or structural characteristics of the object, in accordance with the target view perspective of the portion of the 3-D object scene, so that the generated 2-D morphed image (e.g., 504) can comprise the object(s) as modified to have the modified geospatial characteristics and/or optical (e.g., visual) or structural characteristics to thereby result in the 2-D morphed image (e.g., 504) depicting the object with the appropriate geospatial characteristics and/or optical (e.g., visual) or structural characteristics corresponding to the target view perspective of the portion of the 3-D object scene.

It is to be appreciated and understood that, the image 400 depicts morph target points 406 to the left and to the right of the morph seed points 404. If only one of the left morphed image (e.g., morphed image 506, wherein the morphed image 506 was generated using the morph target points 406 to the right of the morph seed points 404 in image 400) or right morphed image (e.g., morphed image 504, wherein the morphed image 504 was generated using the morph target points 406 to the left of the morph seed points 404 in image 400) is desired, the morph target points 406 relating to the undesired morphed image can be removed or not selected in the first place. Further, in FIG. 5, morphed image 508 is depicted and is a distortion-morphed image based at least in part on a subset of respective morph target points (not shown in FIG. 4), the original image (e.g., image 400 in FIG. 4, image 502 in FIG. 5) or, for example, the morphed image 506.

If more than one 2-D morphed image is to be generated based at least in part on a 2-D image, the respective subsets of morph target points 406 for each morphed image to be generated can be selected by the selector component 306 at the same time or at different times, wherein the morph target points 406 of a respective subset of morph target points can be associated with each other. The distortion morpher component 308 can execute on the respective subsets of morph target points 406 associated with the respective 2-D morph images to be generated for respective different views of the 3-D object scene. In an aspect, the distortion morpher component 308 can generate the respective 2-D morphed images (e.g., morphed image 504, morphed image 506) sequentially or simultaneously (e.g., in parallel). Ultimately, the original or seed 2-D images (e.g., 502) and the associated generated 2-D morphed images (e.g., 504 and/or 506) can have respective views, $v_0, v_1, \ldots, v_j, \ldots v_{N-2}, v_{N-1}$, of the 3-D object scene.

It is to be further appreciated and understood that, the more morph seed points and morph target points that are selected for generating a 2-D morphed image, the higher the quality of the 2-D morphed image, but with that also comes a corresponding increase in the amount of time and resources to generate the 2-D morphed image. Morphing results of a portion of a 2-D morphed image that is in between two morph target points can be interpolated using a predefined interpolation algorithm, which can be part of the predefined distortion morphing algorithm employed by the distortion morpher component 308.

In still another aspect, the image generator component 300 can include a transition morpher component 310 that can employ a specified transition morphing technique(s) to perform transition morphing on a subset of 2-D images having respective views of a portion (e.g., a frame, a moment in time, a section, a segment) of a 3-D object scene to generate one or more 2-D morphed images (e.g., 2-D transition-morphed images) of one or more respective different views of the portion of the 3-D object scene, wherein the different views can be located in between the views of the seed 2-D images that were used for the transition morphing. For example, if there is a first transition image from a first perspective (e.g., $v_j$) in relation to the 3-D object scene, and a second transition image from a second perspective (e.g., $v_{j-2}$) in relation to the 3-D object scene, the transition morpher component 310 can generate a transition-morphed image from a different perspective (e.g., $v_{j-1}$), which is located in between the first perspective and second perspective, in relation to the 3-D object scene, based at least in part on the first transition image, second transition image, and the predefined transition-morphing algorithm.

In an aspect, a 2-D transition-morphed image can depict the object features of objects in the 3-D object scene in the respective locations (or at least substantially close to the respective locations) those object features would have been in had an actual 2-D image of the different (e.g., third) perspective been captured, and the object features can be depicted as having the same or substantially the same other qualities (e.g., shape, look, color, texture, etc.) those object features would have had if an actual 2-D image of the different perspective been captured. That is, in generating the 2-D morphed image (e.g., 706 in FIG. 7) in accordance with the different perspective (e.g., $v_{j-1}$), the transition morpher component 310 can modify geospatial characteristics of an object(s) from what those characteristics respectively are in the first transition image and second transition images (e.g., relative and respective geospatial locations of respective features of the object as the object is, respectively, in the first and second transition images can be modified so that such characteristics can be depicted as such characteristics would be perceived from the different perspective) and/or optical (e.g., visual) or structural characteristics in the object(s) (e.g., relative and respective shapes, sizes, textures, colors, illumination, shading, depth, etc., of respective features of the object as the object is, respectively, in the first and second transition images can be modified so that such characteristics can be depicted as such characteristics would be perceived from the different perspective) from how such characteristics appear in the first transition image 602 (e.g., first 2-D transition image) and second transition image 604 (e.g., second 2-D transition image), respectively, to generate modified geospatial characteristics and/or optical (e.g., visual) or structural characteristics of the object, in accordance with the different perspective of the portion of the 3-D object scene, so that the generated 2-D morphed image (e.g., 706 in FIG. 7) can comprise the object(s) as modified to have the modified geospatial characteristics and/or optical (e.g., visual) or structural characteristics to thereby result in the 2-D morphed image (e.g., 706) depicting the object with the appropriate geospatial characteristics and/or optical (e.g., visual) or structural characteristics corresponding to the different perspective of the portion of the 3-D object scene.

Figure 12:
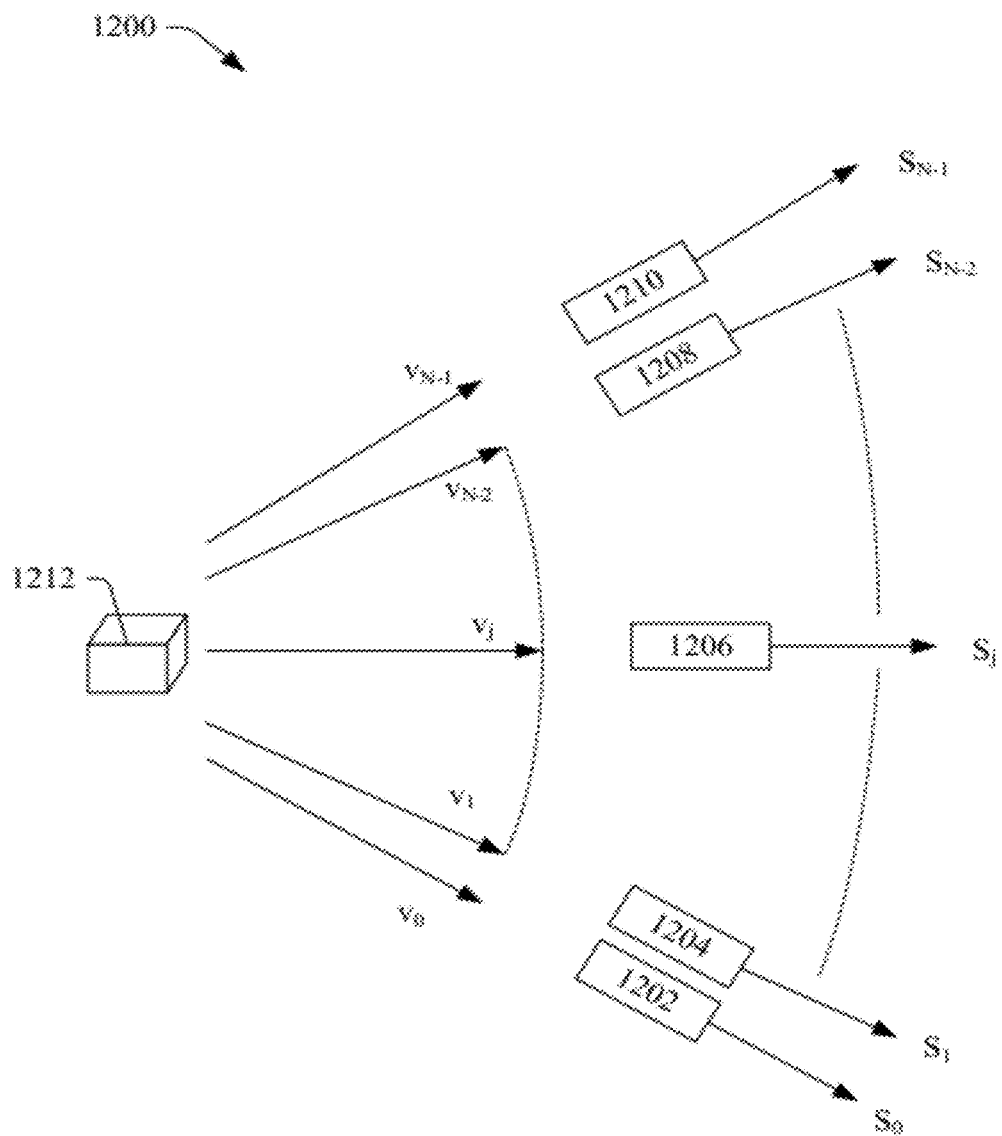
FIG. 12 depicts an example system that can capture at least a portion of a scene (e.g., real 3-D object scene comprising one or more objects) from multiple viewing positions to facilitate reproducing a 3-D holographic image in accordance with an embodiment of the disclosed subject matter.

Transitioning morphing can be performed, for example, when there are two or more 2-D images from respective perspectives of a portion (e.g., a frame, a moment in time, a section, a segment) of a 3-D object scene, or when there is initially one 2-D image from one perspective of the portion of the 3-D object scene and at least one 2-D morphed image (e.g., 2-D distortion-morphed image) of a different perspective(s) of the portion of the 3-D object scene has been created. Two or more 2-D images from respective perspectives of a portion of a 3-D object scene can be obtained, for example, when there are two or more capture components, which are respectively located in relation to the 3-D object scene so as to have the respective perspectives of the 3-D object scene, wherein the two or more capture components capture the respective 2-D images from the respective perspectives of a portion of a 3-D object scene, and communicate those 2-D images to the HPM (e.g., 102). A system that has multiple capture components to facilitate capturing the two or more from respective perspectives of a portion of a 3-D object scene is depicted in FIG. 12.

Figure 6:
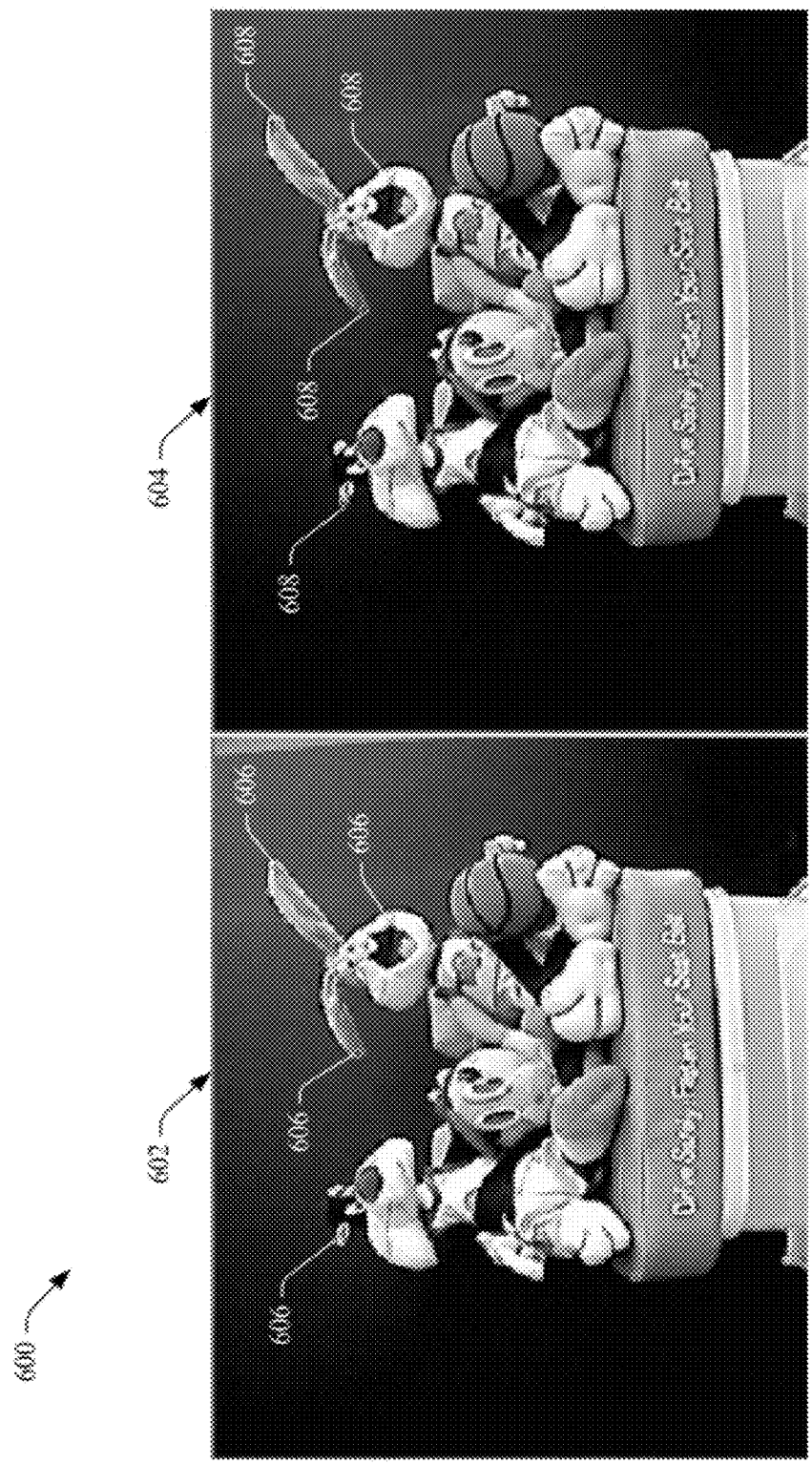
FIG. 6 depicts example transition images that can be employed to facilitate transition morphing, in accordance with various aspects.
Figure 7:
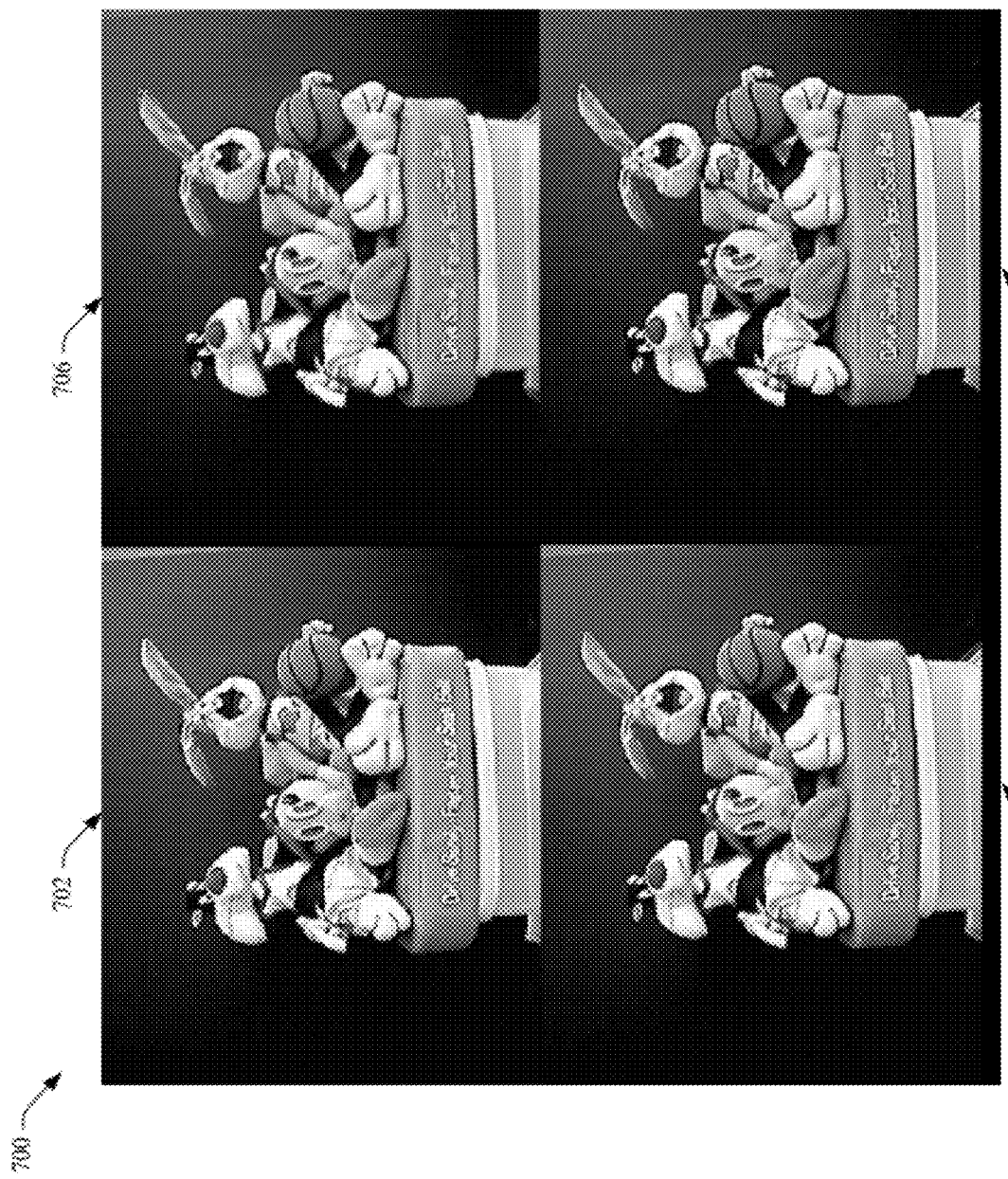
FIG. 7 depicts example transition morphing results 700, in accordance with various aspects.

Referring briefly to FIGS. 6 and 7 (along with FIG. 3), in accordance with various aspects, illustrated in FIG. 6 are example transition images 600 that can be processed using the transition morphing technique(s) to generate, for instance, one or more 2-D morphed images as shown in the example transition morphing results 700 depicted in FIG. 7. The example transition images 600 can include a first 2-D transition image 602 and a second 2-D transition image 604, which respectively can be of different 2-D views of a portion (e.g., a frame, a moment in time, a section, a segment) of a 3-D object scene.

In another aspect, in the first transition image 602 (which is the first transition image 702 in FIG. 7), a specified number of primary transition points 606 can be identified by the identification component 304 and selected by the selector component 306, both of which can be operating in conjunction with the transition morpher component 310. For example, the primary transition points 606 can be one or more end points (e.g., tip of an ear, tip of a nose, tip of a finger, tip of a toe, etc.) or other items of interest (e.g., eye, lips, cheek, etc.) associated with an object (e.g., face, body, etc.) in a 2-D image, wherein the transition morphing of an image can be varied based at least in part on the location of the primary transition points 606 in relation to the first transition image 602.

In identifying and selecting morph points (e.g., primary transition points 606, corresponding transition points 608), it is typically desirable to have morph points in the respective 2-D images for each object feature of an object in the 2-D images that have geospatial characteristics (e.g., 3-D geospatial characteristics) and/or optical or structural characteristics that have at least a predefined amount of change (e.g., relative geospatial location change; relative change in texture, color, illumination, shading, depth, etc.) between the first transition image 602 and the second transition image 604, in accordance with predefined morphing criteria. In another aspect, the transition morpher component 310 and identification component 304 can operate in conjunction with each other to analyze the first transition image 602 and second transition image 604, and apply predefined morphing (e.g., transition) criteria, to automatically identify differences in geospatial characteristics and/or optical or structural characteristics of object features of objects in the respective images 602 and 604, and can automatically place morph points on the identified object features in the respective images that meet the predefined morphing criteria, such as a criterion that a morph point is placed in the location of an object feature when there is at least a predefined amount (e.g., level) of difference in geospatial characteristics and/or optical or structural characteristics of such object feature between the first transition image 602 and the second transition image 604.

In still another aspect, in the second transition image 604 (which is the second transition image 704 in FIG. 7), a specified number of corresponding transition points 608 can be identified by the identification component 304 and selected by the selector component 306, wherein respective corresponding transition points 608 can correspond to like (e.g., corresponding) primary transition points 606 in the first transition image 602. For instance, if in the first transition image 602, a primary transition point 606 is the tip of the right ear of a rabbit, in the second transition image 604, a corresponding transition point 608 can be the tip of the right ear of a rabbit, wherein the corresponding transition point 608 can be located in the same or different position geometrically as the primary transition point 606, depending in part on the movement, animation, or change in perspective of the tip of the right ear of the rabbit in the 3-D object scene. It is to be appreciated and understood that, for reasons of brevity and clarity, only certain of the primary transition points 606 and corresponding transition points 608 are labeled in FIG. 6, but as is readily seen in FIG. 6, the first transition image 602 contains a number of other primary transition points 606 which are not labeled in FIG. 6 and the second transition image 604 contains a number of other corresponding transition points 608 which are not labeled in FIG. 6.

The transition morpher component 310 can associate (e.g., tag, link, connect) the primary transition point 606 and its corresponding transition point 608, so that when the transition morphing is performed, a desirable (e.g., proper) 2-D transition-morphed image(s) (e.g., first transition-morphed image 706 and second transition-morphed image 708 in FIG. 7) can be generated by the transition morpher component 310 using a predefined transition-morphing algorithm. The 2-D transition-morphed image(s) can be from a different perspective(s) that is located, in relation to the 3-D object scene, in between the location of the first perspective of the first transition image 602 and the location of the second perspective of the second transition image 604.

As can be seen in FIG. 7, the first transition-morphed image 706 and second transition-morphed image 708 are from respective perspectives that are located, in relation to the 3-D object scene, in between the location of the first perspective of the first transition image 702 and the location of the second perspective of the second transition image 704 (e.g., the first transition image 702 is facing slightly to the right when the viewer's perspective is from the center, and the transition-morphed images 706 and 708 depict the 3-D object scene from perspectives that are increasingly closer to being forward-facing to the viewer as compared to the first transition image 702, and the second transition image 704 is facing forward when the viewer's perspective is from the center). Ultimately, the original or seed 2-D images (e.g., 702, 704) and the associated generated 2-D morphed images (e.g., 706, 708) can have respective views, $v_0, v_1, \ldots, v_j, \ldots v_{N-2}, v_{N-1}$, of the 3-D object scene. It is to be appreciated and understood that different assignments of morph points, such as a primary transition point and corresponding transition point, can respectively create different morphing effects or results.

Referring still to FIG. 3, the image generator component 300 also can comprise a processor component 312 that can work in conjunction with the other components (e.g., communicator component 302, identification component 304, selector component 306, distortion morpher component 308, transition morpher component 310, etc.) to facilitate performing the various functions of the image generator component 300. The processor component 312 can employ one or more processors, microprocessors, or controllers that can process data, such as information (e.g., visual information) relating to a 3-D object scene, distortion morphing algorithm(s), transition morphing algorithm(s), data relating to parameters associated with the image generator component 300 and associated components, etc., to facilitate processing or generating 2-D images, including 2-D morphed images, associated with a 3-D object scene; and can control data flow between the image generator component 300 and other components associated with the image generator component 300.

In yet another aspect, the image generator component 300 can contain a data store 314 that can store data structures (e.g., user data, metadata); code structure(s) (e.g., modules, objects, classes, procedures), commands, or instructions; information relating to a 3-D object scene; 2-D images, including 2-D morphed images, associated with a 3-D object scene; distortion morphing algorithm(s); transition morphing algorithm(s); parameter data; and so on. In an aspect, the processor component 312 can be functionally coupled (e.g., through a memory bus) to the data store 314 in order to store and retrieve information desired to operate and/or confer functionality, at least in part, to the communicator component 302, identification component 304, selector component 306, distortion morpher component 308, transition morpher component 310, and/or substantially any other operational aspects of the image generator component 300. It is to be appreciated and understood that the communicator component 302, identification component 304, selector component 306, distortion morpher component 308, transition morpher component 310, processor component 312, and data store 314 each can be a stand-alone unit, can be included within the image generator component 300 (as depicted), can be incorporated within another component, and/or virtually any suitable combination thereof, as desired.

Figure 8:
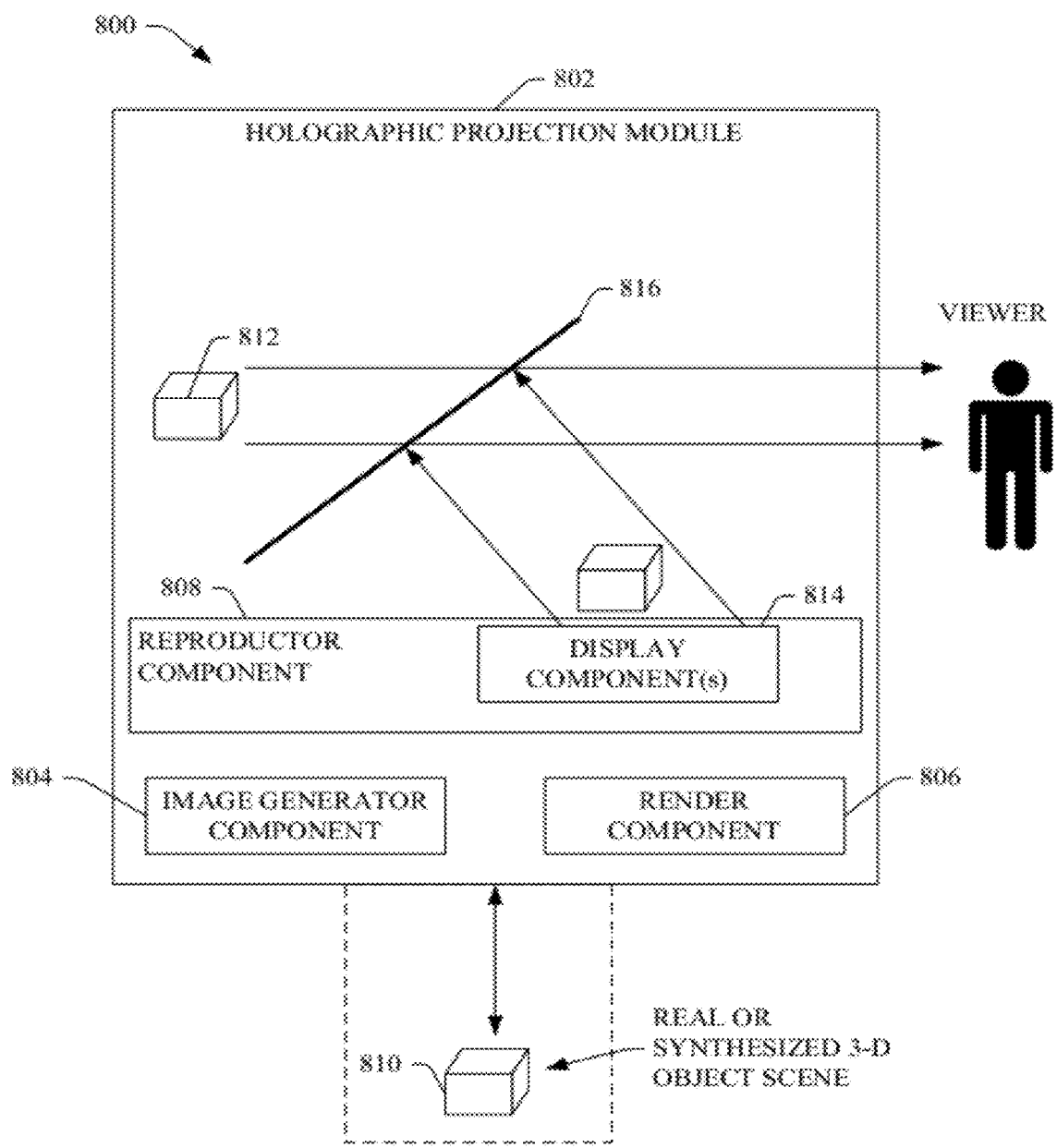
FIG. 8 illustrates a diagram of an example system that can generate and display a multiple view 3-D holographic scene (e.g., comprising one or more 3-D holographic images) of a 3-D object scene in accordance with various embodiments and aspects.

Turning to FIG. 8, depicted is a diagram of an example system 800 that can generate and display a multiple view 3-D holographic scene (e.g., comprising one or more 3-D holographic images) of a 3-D object scene in accordance with various embodiments and aspects. In an aspect, the system 800 can be a multiple-view aerial holographic projection system (MVAHPS) that can generate and display a 3-D holographic scene of a 3-D real or synthetic, static or animated, object scene viewable from multiple perspectives in relation to the 3-D object scene being reproduced, wherein the 3-D holographic scene can be viewed, for example, as a 3-D holographic image(s) floating in mid-air (e.g., aerially) in a desired display area (e.g., 3-D chamber). The system 800 can comprise one or more holographic projection modules (HPMs) 802 that can each can include an image generator component 804 and a render component 806, each of which can be the same as or similar to, and/or can comprise the same or similar functionality as, respective components, as more fully disclosed herein.

In another aspect, each HPM 802 can contain a reproductor component 808 (e.g., optical wave reproduction unit) that can reproduce optical waves associated with the 3-D object scene 810 to facilitate projecting a 3-D holographic scene 812 of the 3-D object scene 810 from multiple views (e.g., including front side, left side, back side, right side, . . . ). It is to be appreciated and understood that only one HPM 802 is depicted in FIG. 8 for brevity and clarity.

In accordance with various aspects, the HPM 802 can perform real-time capturing of real world 3-D object scenes, as well as generating (e.g., building, constructing, synthesizing) synthetic graphic models of synthetic 3-D object scenes, to be displayed in the display area (e.g., displayed on/in the 3-D chamber). In another aspect, the reproductor component 808 can process the visual information associated with the original 3-D object scene 810, wherein the visual information can comprise respective portions of visual information (e.g., 2-D images, which can include one or more 2-D morphed images, as more fully disclosed herein) respectively associated with the respective viewing positions in relation to the original 3-D scene 810 that were captured or generated by the HPM 802 along those respective viewing positions (e.g., using a capture components such as an array of cameras, with a camera at each viewing position; using the image generator component 804 to generate one or more 2-D morphed images) for a real 3-D object scene 810, or can comprise respective portions of visual information (e.g., 2-D images, which can include one or more 2-D morphed images, as more fully disclosed herein) respectively associated with the respective viewing positions in relation to the original 3-D object scene 810, wherein the visual information was, at least in part, generated to synthesize a 3-D object scene, and the respective portions of the visual information are received or generated by the HPM 802, wherein the respective portions of visual information can correspond to the respective viewing positions for a synthetic 3-D object scene 810.

The reproductor component 808 can process the respective portions of the visual information associated with the 3-D object scene 810 and can generate model data based at least in part on the visual information portions, wherein the model data can be used to create a 3-D model of the original 3-D object scene 810 being reproduced. The reproductor component 808 can convert the model data (e.g., respective portions of model data corresponding to respective viewing positions in relation to the 3-D object scene 810) into holographic data to facilitate generating a 3-D holographic scene 812 as a reproduction of the 3-D object scene 810.

The reproductor component 808 can generate the 3-D holographic scene 812 based at least in part on the holographic data associated with the 3-D object scene 810. For instance, respective portions of the holographic data corresponding to respective viewing positions in relation to the 3-D object scene 810 can be used to generate respective portions of the 3-D holographic scene 812 corresponding to respective viewing positions in relation to the 3-D holographic scene 812 (e.g., corresponding to respective viewing positions of each 3-D holographic image of the 3-D holographic scene 812).

In still another aspect, the reproductor component 808 can include one or more display components 814 (e.g., color or monochrome display) where a display component 814 can be a holographic display section (HDS) that can reproduce at least partially the optical wave scattered by the 3-D object scene 810 (e.g., real 3-D object scene) along a specific viewing position with respect to the 3-D object scene 810. The reproductor component 808 can provide the respective portions of the holographic data or respective portions of the 3-D holographic scene 812 to respective display components 814, wherein the respective display components 814 can be respectively positioned in relation to a display area, wherein the 3-D holographic scene 812 is to be projected, to correspond with the respective viewing positions of the original 3-D object scene 810, so that the 3-D holographic scene 812 will be an accurate reproduction of the original 3-D object scene 810. That is, the display components 814 can be spatially juxtapositioned with respect to each other and the scene to allow viewers of the 3-D holographic scene 812 associated with the 3-D object scene 810 to observe a realistic reproduction of the 3-D object scene 810 from different perspectives (e.g., viewing angles or positions).

For example, there can be four display components 814 where the first display component (e.g., 814) can reproduce at least partially the optical wave scattered by the 3-D object scene 810 along a viewing position at the front portion of the 3-D object scene 810 and/or reproduce one or more generated 2-D images (e.g., synthesized 2-D images, 2-D morphed images) along a respective viewing position(s) at the front portion of the 3-D object scene 810; the second display component (e.g., 814) can reproduce at least partially the optical wave scattered by the 3-D object scene 810 along a viewing position(s) at the left-side portion of the 3-D object scene 810 and/or reproduce one or more generated 2-D images (e.g., synthesized 2-D images, 2-D morphed images) along a respective viewing position(s) at the left-side portion of the 3-D object scene 810; the third display component (e.g., 814) can reproduce at least partially the optical wave scattered by the 3-D object scene 810 along a viewing position(s) at the back portion of the 3-D object scene 810 and/or reproduce one or more generated 2-D images (e.g., synthesized 2-D images, 2-D morphed images) along a respective viewing position(s) at the back portion of the 3-D object scene 810; and the fourth display component (e.g., 814) can reproduce at least partially the optical wave scattered by the 3-D object scene 810 along a viewing position(s) at the right-side portion of the 3-D object scene 810 and/or reproduce one or more generated 2-D images (e.g., synthesized 2-D images, 2-D morphed images) along a respective viewing position(s) at the right-side portion of the 3-D object scene 810. For each display component 814 associated with the 3-D object scene 810, the optical waves that emerge from the display component 814 can reproduce with a desired degree of fidelity, a virtual 3-D holographic scene 812 of the original 3-D object scene 810 along the specific viewing position(s) with respect to the 3-D object scene 810 with which the display component 814 is associated.

In yet another aspect, each display component 814 can be associated with a reflector component 816 that can reflect a desired portion of the 3-D holographic image(s) of a 3-D holographic scene to direct the desired portion of the 3-D holographic scene to the display area, so that the 3-D holographic scene 812 is viewable by an observer(s). In an embodiment, the reflector component 816 can be a beam splitter that can receive the optical waves associated with the 3-D holographic images projected by the corresponding display component 814 and can reflect at least partially the 3-D holographic scene 812 (e.g., one or more 3-D virtual images) of the original 3-D object scene 810 (e.g., the portion of the 3-D holographic scene 812 corresponding to the specific viewing position(s) with respect to the 3-D object scene 810 with which the particular display component 814 is associated) to project that 3-D holographic scene 812 to the display area, for example, as a floating 3-D holographic image.

In an aspect, the respective portions of the 3-D holographic scene 812 respectively associated with the respective display components 814 can be projected by the display components 814 and associated reflector components 816 so that the respective portions appear as a cohesive 3-D holographic scene 812 to the viewer. As the optical waves are derived from the original object 3-D object scene 810 and/or are generated in relation to 2-D synthesized or morphed images of the 3-D object scene 810 by the HPM 802, the 3-D holographic scene 812 produced by the HPM 802 preserves, at least to a desired extent, the depth perception as well as the parallax information associated with the original 3-D object scene 810.

As a result, a viewer observing the 3-D holographic scene 812 can experience the depth and the parallax or disparity, for example, when changing viewing positions with respect to the 3-D holographic scene 812 (e.g., as the observer views the 3-D holographic image(s) from different vantage points as the observer walks around the display area or otherwise shifts his viewing position in relation to the display area). In still another aspect, the HPM 802, including the image generator component 804, render component 806, reproductor component 808, display component(s) 814 and reflector component(s) 816, can employ various parameters (e.g., illumination parameters for the display component 814, parameters relating to angle of the reflector component 816 with respect to the associated display component 814, parameters relating to capturing or processing visual information relating to a 3-D object scene, parameters relating to level of reflection of the 3-D holographic image by the reflector component 816, etc.) that can be controlled via the HPM 802 and/or a computing device (e.g., computer) associated with the HPM 802.

The various embodiments of the subject disclosure can be employed for numerous applications, which can include, for example, 3-D movie viewing, advertisements, video games, and scientific research, as more fully disclosed herein. Further, one or more embodiments, with the advancement of the technology, as desired, can be realized with available electronics and computing resources, and moderate changes in the existing video framework. As a result, such embodiments are economical and can be easily utilized by movie producers, graphic designers, and content providers in general.

It is to be appreciated and understood, that while system 800 is shown with one HPM 802, one image generator component 804, one render component 806, one reproductor component 808, one display component 814, and one reflector component 816, the various embodiments described herein are not so limited as there can be any desired number of HPMs 802, image generator components 804, render components 806, reproductor components 808, display components 814, and reflector components 816. Further, an HPM 802 can have any desired number of display components 814. Also, while one 3-D object scene 810 is depicted and one 3-D holographic scene 812 is reproduced based at least in part on that scene 810, the subject disclosure is not so limited as there can be more than one 3-D object scene 810 for which the HPM 802 can reproduce a corresponding number of 3-D holographic scenes 812, as desired, wherein each 3-D object scene 810 can comprise one or more objects (e.g., persons, items, etc.).

Figure 9:
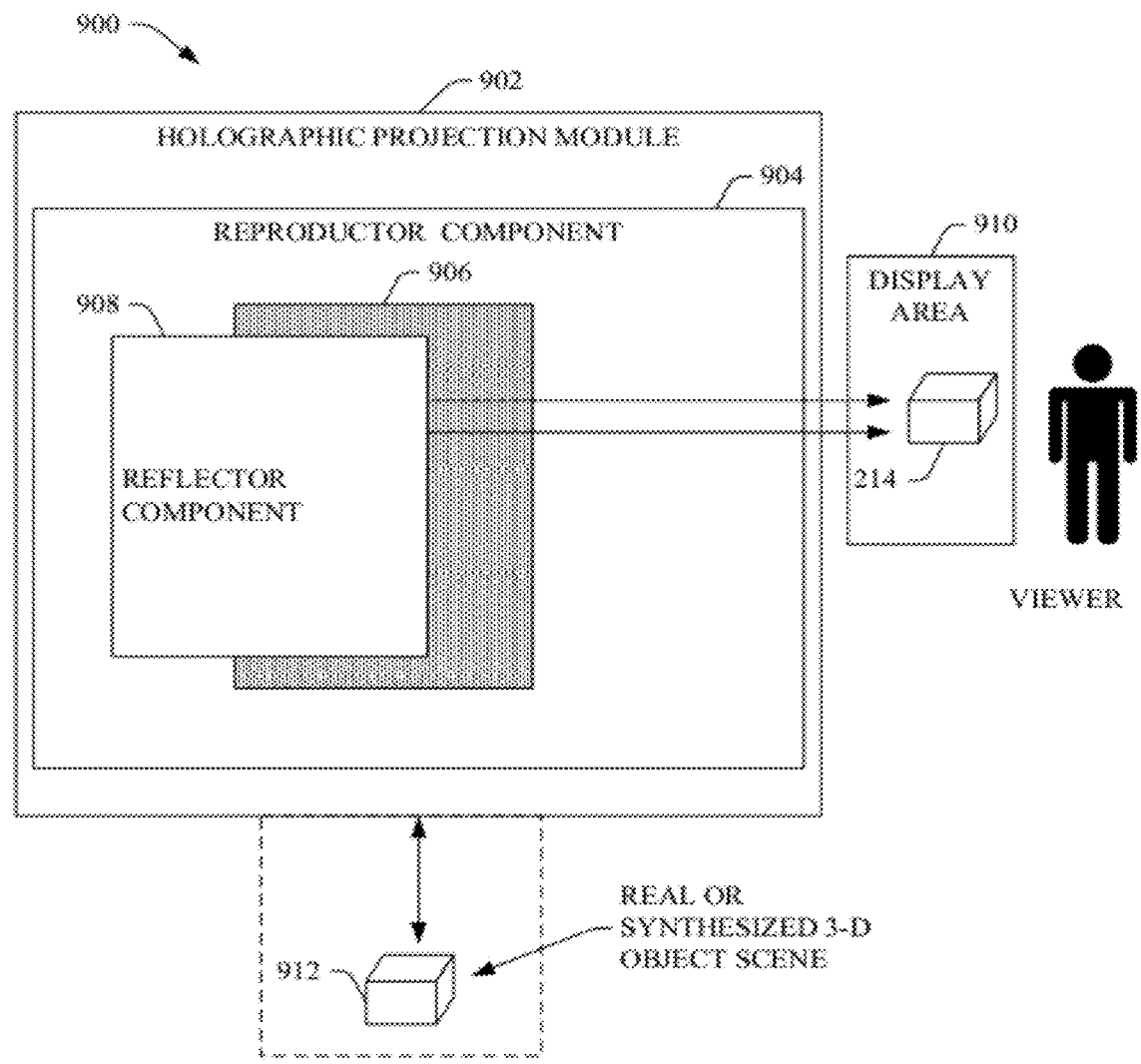
FIG. 9 illustrates depicts a diagram of a top view of an example system that can generate and display a multiple-view 3-D holographic image(s) of a 3-D object scene in accordance with an embodiment of the disclosed subject matter.

Referring briefly to FIG. 9 (along with FIG. 8), FIG. 9 depicts a diagram of a top view of an example system 900 that can generate and display a multiple-view 3-D holographic image(s) of a 3-D object scene in accordance with an embodiment of the disclosed subject matter. In an aspect, the system 900 can be a MVAHPS that can generate and display a 3-D holographic scene that can be a reproduction of a 3-D real or synthetic, static or animated, 3-D object scene viewable from multiple perspectives. The system 900 can include an HPM 902, a reproductor component 904, a display component 906, and a reflector component 908, and further can include an image generator (not shown for reasons of clarity and brevity) and a render component (not shown for reasons of clarity and brevity), wherein each can comprise the same or similar functionality or features of respective components (e.g. respectively named components), such as more fully described herein.

In an aspect, the display component 906 can be positioned as desired with respect to a surface (e.g., placed horizontal on a flat surface). A reflector component 908 can be positioned above the associated display component 906 at a desired distance away from the display component 906 and can be angled (not shown in FIG. 9; for example, as depicted in FIG. 8) at a specified angle, as desired, with respect to the associated display component 906 and the display area 910 (e.g., 3-D chamber). In an aspect, the HPM 902 can capture, receive, and/or generate visual information associated with an original 3-D object scene 912 (e.g., capture optical waves associated with a real 3-D object scene from multiple viewing positions; receive or generate data that synthesizes a 3-D object scene from multiple viewing positions; generate one of more 2-D morphed images that respectively depict different viewing positions of a 3-D object scene; etc.) and can reproduce the original 3-D object scene 912, or a desired portion thereof (e.g., along a specific viewing angle with respect to the scene 912), as a 3-D holographic scene 914 in the display area 910.

Figure 10:
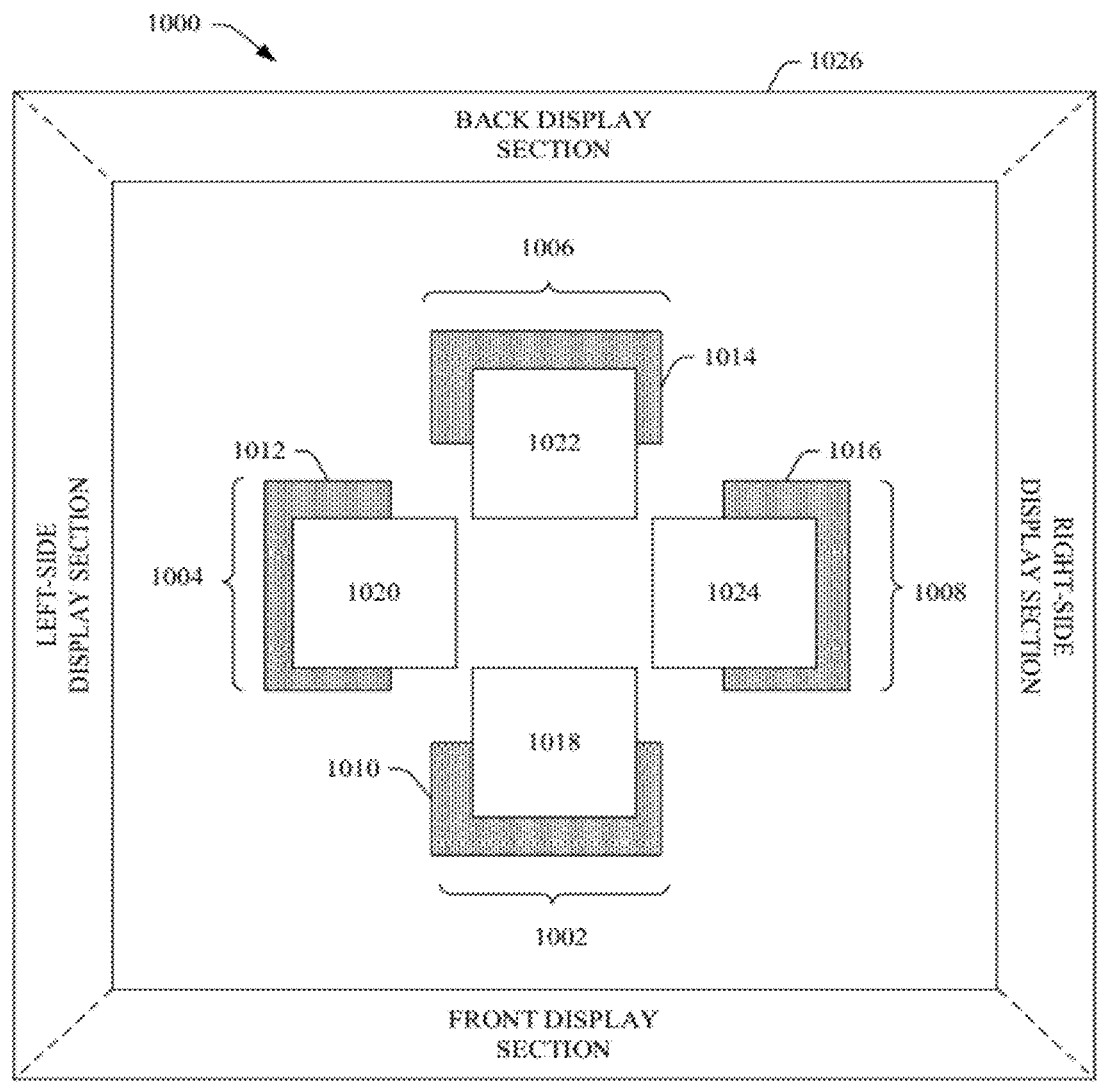
FIG. 10 depicts a diagram of a top view of an example system that can employ multiple display components to generate and display a multiple-view 3-D holographic scene (e.g., comprising one or more 3-D images of a 3-D holographic scene) in accordance with an embodiment of the disclosed subject matter.

Turning to FIG. 10 (along with FIG. 8), FIG. 10 illustrates a diagram of a top view of an example system 1000 that can employ multiple display components to generate and display a multiple-view 3-D holographic scene (e.g., comprising one or more 3-D images of a 3-D holographic scene) in accordance with an embodiment of the disclosed subject matter. In an aspect, the system 1000 can be a MVAHPS that can generate and display a 3-D holographic scene that is a reproduction of a 3-D real or synthetic, static or animated, 3-D object scene viewable from multiple perspectives, such as a front view, left-side view, back view, and right-side view of the 3-D object scene. The system 1000 can comprise four HPMs 1002, 1004, 1006 and 1008, four display components 1010, 1012, 1014 and 1016 (e.g., HDSs), and four reflector components 1018, 1020, 1022 and 1024 (e.g., beam splitters), that can each comprise the same or similar functionality or features of respective components (e.g. respectively named components), such as more fully described herein. Each of the HPMs can include image generator components, render components, and reproductor components (wherein the reproductor components respectively can comprise or be associated with the respective display components 1010, 1012, 1014, and 1016; however, for brevity and clarity, the image generator components, render components, and reproductor components are not shown in FIG. 10.

In an aspect, the HPMs 1002, 1004, 1006 and 1008 can project a corresponding portion of a 3-D holographic reproduction a 3-D object scene of the respectively associated display components 1010, 1012, 1014 and 1016, to respectively unique directions. In accordance with an embodiment, the four HPMs 1002, 1004, 1006 and 1008 can project four respective holographic 3-D scene (e.g., front view image portion, left-side view image portion, back view image portion, and right-side view image portion of the 3-D holographic reproduction of the original 3-D object scene) to the front direction, left-side direction, back direction, and right-side direction. The respective portions of the holographic 3-D scene (e.g., partial images from the respective display components that when combined form a whole 3-D holographic image that is part of the 3-D holographic scene), that is, the respective optical waves of the 3-D holographic images, that are projected from (e.g., emerging from) the respective display components 1010, 1012, 1014 and 1016 can be reflected, at least partially, off of the respective reflector components 1018, 1020, 1022 and 1024 so that the respective holographic 3-D image portions can be displayed together as a whole 3-D image of the 3-D holographic scene in a display area 1026 (e.g., 3-D chamber), which can be in an area located outside of the four HPMs 1002, 1004, 1006 and 1008, and which can comprise, for example, a front display section, left-side display section, back display section and right-side display section that respectively can display the respective 3-D holographic image portions projected from the four HPMs 1002, 1004, 1006 and 1008, to facilitate presenting the 3-D holographic image representing a portion (e.g., a frame, a moment in time, a section, a segment) of the original 3-D object scene as a whole 3-D holographic image to viewers. The reflector components 1018, 1020, 1022 and 1024 can be angled at a desired angle in relation to the display components 1010, 1012, 1014 and 1016 to facilitate accurate reflection of the respective holographic 3-D image portions to the desired positions (e.g., front, left side, back, right side) in the display area 1026.

It is to be appreciated and understood that the while system 1000 is shown with four HPMs 1002, 1004, 1006 and 1008, four display components 1010, 1012, 1014 and 1016, and four reflector components 1018, 1020, 1022, and 1024, the subject disclosure is not so limited, as there can be virtually any number (e.g., less than four, four, more than four) of HPMs, display components, and/or reflector components, as desired. Further, in accordance with various embodiments, the subject disclosure can comprise an HPM that comprises multiple display components (e.g., a single HPM can include four display components); and/or a single or other desired number of display components can be employed, wherein the display component(s) can comprise more than one display section, wherein each display section can display or project a respective portion of the 3-D holographic image of a 3-D holographic scene.

For example, as desired, a 3-D object scene can be captured by virtually any desired number of capture components (e.g., 1, 2, 3, ..., 120, ..., 240, ..., 360, ...) from different viewing perspectives (e.g., when 360 capture components are employed, each of the capture components can be placed one degree apart from each other, for instance, forming a circle of capture components around the 3-D scene), and/or at least a portion of the 3-D object scene from different viewing perspectives can be generated, for example, by generating 2-D morphed images, as more fully disclosed herein, and the captured or generated visual information associated with the 3-D object scene can be used to generate respective portions of a 3-D holographic image, and a corresponding number of display sections can be employed to facilitate producing and displaying the respective portions of the 3-D holographic image of the 3-D object scene as an integrated 3-D holographic image in the display area 1026. It is also to be appreciated and understood that the while the display components 1010, 1012, 1014 and 1016 and reflector components 1018, 1020, 1022, and 1024 are depicted as being rectangular in shape, the subject disclosure is not so limited, and the display components and reflector components can be shaped in virtually any desired shape (e.g., triangle, square, rectangle, circular, oval, irregular shape, etc.).

With regard again to FIG. 8, in accordance with another aspect, the display component 814 (e.g., HDS) can project or emit a computer-generated off-axis 3-D hologram image, or desired portion thereof (e.g., corresponding to a unique viewing position with respect to the original 3-D object scene), wherein the computer-generated off-axis 3-D hologram image, for example, can be printed on a static media such as a photographic film, or can be displayed on an electronic accessible device such as a Spatial Light Modulator (SLM).

For instance, the following process can be employed to facilitate display of the computer-generated off-axis 3-D hologram image. In an aspect, an original 3-D scene can be composed of a collection of 3-D object points given by $O(x, y, z) = [o_0(x_0, y_0, z_0), o_1(x_1, y_1, z_1), \ldots, o_{N-1}(x_{N-1}, y_{N-1}, z_{N-1})]$. An on-axis Fresnel hologram $H_{on}(x,y)$ can be generated numerically employing the following equation (1).

$$H_{on}(x, y) = \sum_{j=0}^{N-1} \frac{a_j}{r_j} \exp(ikr_j) \quad (1)$$

where $k=2\pi/\lambda$ is the wave number of the laser light with $\lambda$ being the wavelength of the laser light. The $\alpha_j$ can represent the amplitude of the 'jth' object point, and $r_j = \sqrt{(x_j-x)^2+(y_j-y)^2+z_j^2}$ can be the distance between the object point $(x_j, y_j, z_j)$ and a point $(x,y)$ on the hologram. With regard to Equation (1), it is assumed the hologram is on the x-y plane (e.g., on the z=0 plane) and the object point is at a perpendicular distance $z_j$ away from the hologram. The diffraction patterns of the 3-D object is a superposition of Fresnel zone plates (FZPs) (e.g., the function $\exp(ikr_j)$) each contributed by a unique object point. The process can be interpreted as a numerical realization of holograms generated by optical scanning holography.

An off-axis hologram can be derived from $H_{on}(x,y)$ by adding a planar, or a spherical reference beam $B(x,y)$ with certain angle of illumination as $$H(x,y) = H_{on} \cdot B(x,y). \quad (2)$$

To produce the hologram on printed media, such as a photographic film, or displaying the hologram on electronic accessible device, such as an SLM, only the real part $H'(x,y)$ of the hologram is retained as given by $$H'(x,y) = Re[H(x,y)]. \quad (3)$$

A reason only the real part of the hologram is retained is that only the real part of the hologram can be displayed. A display component 814 (e.g., HDS) can be constructed with a printed media, or an electronic accessible device (e.g., SLM) which displays the hologram H'(x,y).

In accordance with yet another aspect, the display component 814 can be a 3-D hologram representing the optical waves scattered by a real 3-D object scene (or representing computer-generated representation of scattering of optical waves in relation synthesizing a 3-D object scene image or generating a 2-D morphed image relating to a 3-D object scene), and the 3-D hologram image of the 3-D object scene can be acquired with desired optical means, such as by employing a desired number of capture components (e.g., cameras) (not shown) (or at least in part can be generated, as more fully disclosed herein), in respective spatial positions in relation to the real 3-D object scene, to capture the optical waves scattered by the real 3-D object scene from the respective spatial positions (or generate representation of scattering of optical waves by a 3-D object scene). The 3-D hologram representing the real 3-D object scene can be reproduced based at least in part on the visual information (e.g., captured or generated visual information, such as scattered optical waves or data representing scattering of optical waves) relating to the real 3-D object scene.

Figure 11:
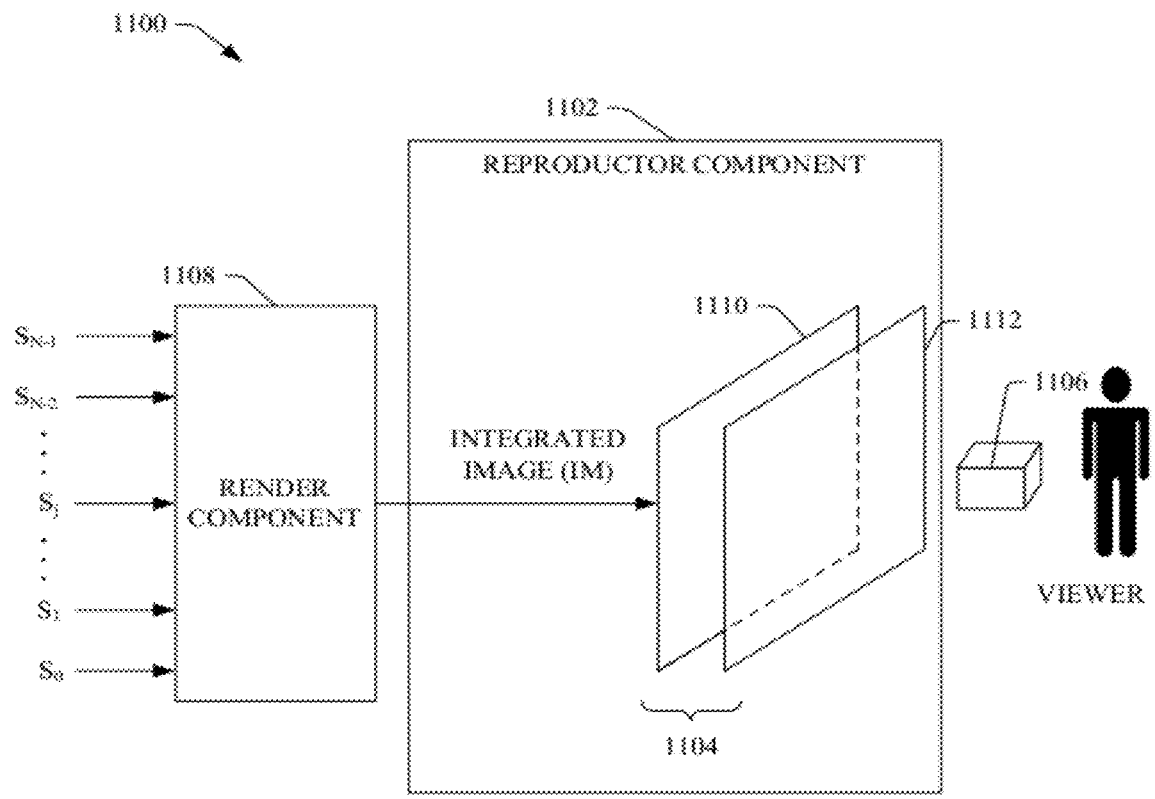
FIG. 11 illustrates a diagram of an example system that can employ a multiple-section display component(s), comprising an autostereoscopic display(s), to generate and display a multiple-view 3-D holographic scene comprising one or more 3-D holographic images in accordance with various aspects and embodiments of the disclosed subject matter.

FIG. 11 illustrates a diagram of an example system 1100 that can employ a multiple-section display component(s), comprising an autostereoscopic display(s), to generate and display a multiple-view 3-D holographic scene comprising one or more 3-D holographic images in accordance with various aspects and embodiments of the disclosed subject matter. In an aspect, the system 1100 can include a reproductor component 1102 that can reproduce optical waves associated with the 3-D object scene to facilitate projecting a 3-D holographic image of the 3-D object scene from multiple views (e.g., front side, left side, back side, right side, . . . ). The reproductor component 1102 can comprise or be associated with a display component 1104, which can be an autostereoscopic display (e.g., a multiple section autostereoscopic display (MSAD)) employed for displaying a 3-D holographic image 1106 of the scene in a desired display area for viewing by observers. The reproductor component 1102 and display component 1104 each can comprise the same or similar functionality or features, or at least a desired portion thereof, of respective components (e.g., respectively named components), such as more fully described herein.

In an aspect, the reproductor component 1102 can be associated with a capture system (e.g., as shown in FIG. 12; not shown in FIG. 11) that can be employed to capture visual information (e.g., optical waves scattered by the 3-D object scene from various viewing positions with respect to the scene) and provide the visual information to a render component 1108 associated with the reproductor component 1102, wherein the render component 1108 can process the visual information to generate an integrated 3-D image, as more fully disclosed herein. The render component 1108 can transmit information relating to the integrated 3-D image to the reproductor component 1102, which can reproduce and display a reconstruction of the 3-D object scene in the form of a 3-D holographic image 1106 in a desired display area based at least in part on the visual information received from the capturing system and/or generated by the HPM or other component.

Referring briefly to FIG. 12 (along with FIG. 11), depicted is an example system 1200 for capture of at least a portion of a scene (e.g., real 3-D object scene comprising one or more objects) from multiple viewing positions to facilitate reproducing a 3-D holographic image in accordance with an embodiment of the disclosed subject matter. In an aspect, the system 1200 (e.g., capture system) can comprise a plurality of capture components (e.g., an array of cameras), such as capture components 1202, 1204, 1206, 1208 and 1210, that can be positioned on a horizontal plane, for example, wherein each of the capture components 1202, 1204, 1206, 1208 and 1210 can capture the projected image of the 3-D object scene 1212 from a respective specific direction in relation to the 3-D object scene 1212. For instance, as depicted in system 1200 of FIG. 12, there can be N views $[v_0, v_1, \ldots, v_{N-2}, v_{N-1}]$ of the 3-D object scene 1212 (e.g., 3-D object scene). Each view $v_j|_{0 \leq j < N}$ of the 3-D object scene 1212 can be captured by a unique capture component of the plurality of capture components, and recorded as a 2-D image $S_j|_{0 \leq j < N}$, for example, as visual information associated with the 3-D object scene 1212 from the respective view. The N respective views of the 3-D object scene 1212, which can be recorded in the N 2-D images $[S_0, S_1, \ldots, S_{N-2}, S_{N-1}]$, can contain the disparity of each point in the 3-D object scene 1212 along the horizontal direction. In another words $[S_0, S_1, \ldots, S_{N-2}, S_{N-1}]$ can record the horizontal parallax information of the 3-D object scene 1212. In accordance with an aspect, the respective visual information (e.g., captured N 2-D images) associated with the N respective views of the 3-D object scene 1212 can be received and recorded (e.g., stored in memory, stored on print media) by the reproductor component 1102 and/or a recording device (not shown), which can provide the visual information to the reproductor component 1102.

With regard to FIG. 11 and system 1100, in an aspect, the render component 1108 can generate a 3-D integrated image representing the 3-D object scene. As stated herein, the reproductor component 1102 can include a display component 1104, which can be an autostereoscopic display. In another aspect, the render component 1108 can be associated with (e.g., connected to) the display component 1104. The render component 1108 can receive the visual information associated with the 3-D object scene, that is, the multi-view images $[S_0, S_1, \ldots, S_{N-2}, S_{N-1}]$ captured by the capture system (e.g., system 1200) can be input to the render component 1108, and the render component 1108 can generate a 3-D integrated image (IM) based at least in part on the visual information associated with the 3-D object scene.

For instance, the render component 1108 can generate holographic data, based at least in part on the visual information associated with the 3-D object scene, and the holographic data can be used by the display component 1104 to reproduce and display the 3-D holographic image 1106 representing the 3-D scene. The 3-D integrated image (e.g., 3-D integrated holographic image) can be displayed by the display component 1104 in the desired display area where observers can view the 3-D holographic image 1106.

In still another aspect, the display component 1104 can be comprised of a display 1110 (e.g., electronic accessible display), which can be an LCD (e.g., high resolution LCD) or other desired type of display, and a 3-D adapter component 1112, which can be associated with the display 1110 and can be utilized to adjust the 3-D holographic image displayed or provided by the display 1110 to improve or enhance the 3-D aspects of the 3-D holographic image displayed by the display 1110. For instance, the 3-D adapter component 1112 can be adhered or attached to the display surface (e.g., having the display screen) of the display 1110. In accordance with various embodiments, the 3-D adapter component 1112 can be a slant or vertical lenticular lens, a slant or vertical parallax barrier (e.g., active parallax barrier), or other desired 3-D adapter.

Figure 13:
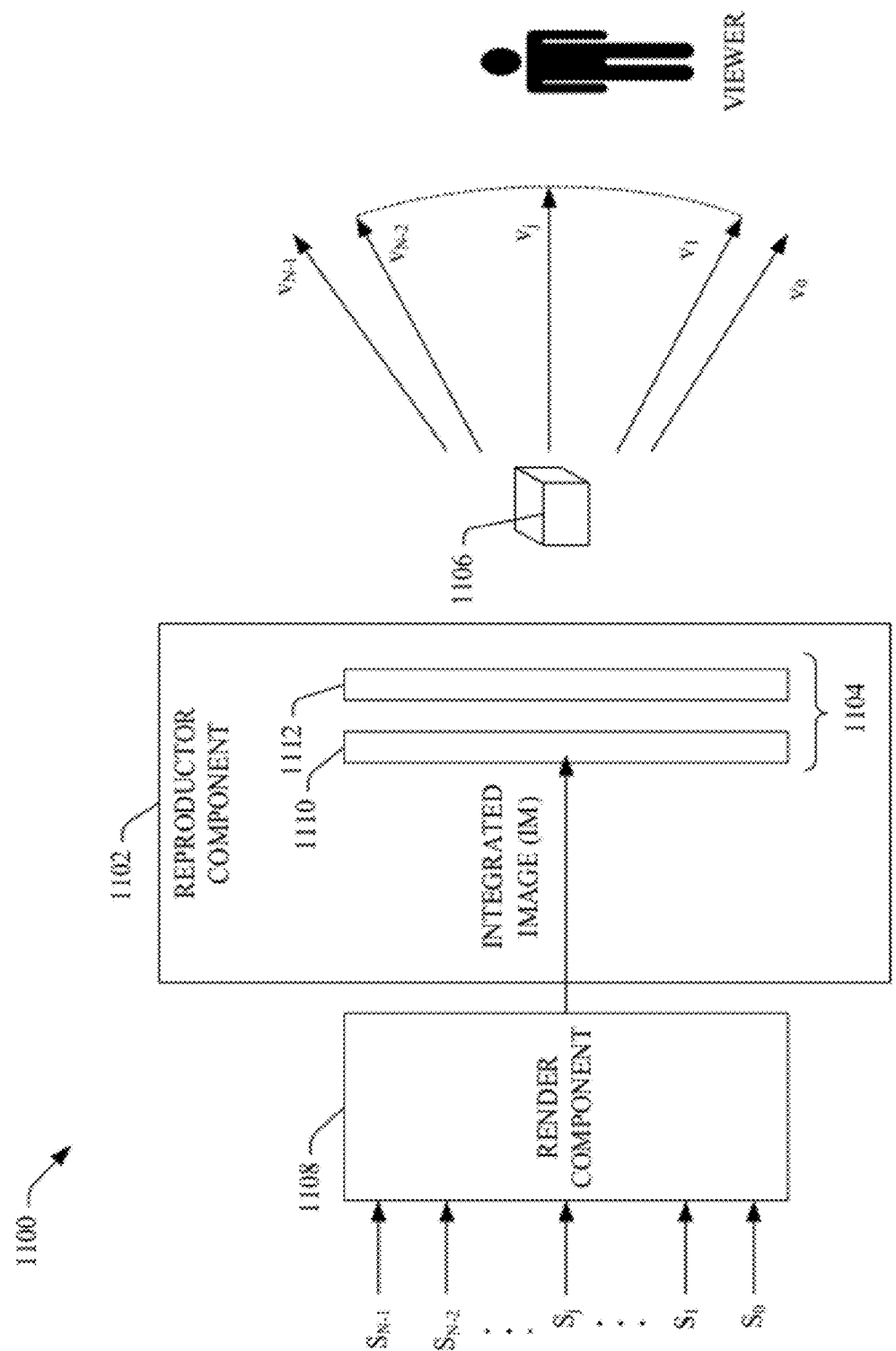
FIG. 13 depicts a diagram of a top view of an example system that can employ a multiple-section display component(s), comprising an autostereoscopic display(s), to generate and display a multiple-view 3-D holographic scene comprising one or more 3-D holographic images in accordance with various aspects and embodiments of the disclosed subject matter.

Referring briefly to FIG. 13 (along with FIG. 11), in FIG. 13, depicted is a diagram of a top view of example system 1100 in accordance with an aspect. In an aspect, the display component 1104 can reconstruct or reproduce the multi-view images [$v_0$, $v_1$, . . . , $v_{N-2}$, $v_{N-1}$], which can respectively correspond to the multi-view images [$S_0$, $S_1$, . . . , $S_{N-2}$, $S_{N-1}$] captured by the capture system (e.g., system 1200), for display as the entire 3-D holographic image 1106 in the display area where the 3-D holographic image 1106 can be viewed by observers, creating a virtual perception of the original scene as captured by the capture system. While not shown in FIGS. 11 and 13 for brevity, the system 1100 also can include and/or be associated with a reflector component (e.g., reflector component 816) that can be arranged at a desired angle with respect to the display component 1104 to facilitate reflecting at least a desired portion of the 3-D holographic image to the display area.

It is to be appreciated and understood, that while system 1100 is shown with one reproductor component 1102, one render component 1108, one display component 1110, and one 3-D adapter component 1112, the subject disclosure is not so limited as there can be any desired number of reproductor components 1102, render components 1108, display components 1110, and 3-D adapter components 1112. Further, an reproductor component 1102 can have any desired number of display components 1110 and 3-D adapter components 1112. For example, as desired, a 3-D object scene can be captured by virtually any desired number of capture components (e.g., 1, 2, 3, . . . , 120, . . . , 240, . . . , 360, . . . ) from different viewing perspectives (e.g., when 360 capture components are employed, each of the capture components can be placed one degree apart from each other, for instance, forming a circle of capture components around the 3-D scene), and the captured visual information associated with the 3-D object scene can be used to generate respective portions of a 3-D holographic image, and a corresponding number of display sections of the display component(s) 1104 can be employed to facilitate producing and displaying the respective portions of the 3-D holographic image of the 3-D object scene as an integrated 3-D holographic image in the display area. Also, while one 3-D holographic image 1106 is reproduced based at least in part on a 3-D object scene, the subject disclosure is not so limited as there can be more than one 3-D holographic image 1106, as desired. Further, while the render component 1108 is depicted as being a stand-alone unit, the disclosed subject matter is not so limited, as in accordance with other embodiments, the render component 1108 can be within another component (e.g., HPM) and/or can be within the reproductor component 1102.

Figure 14:
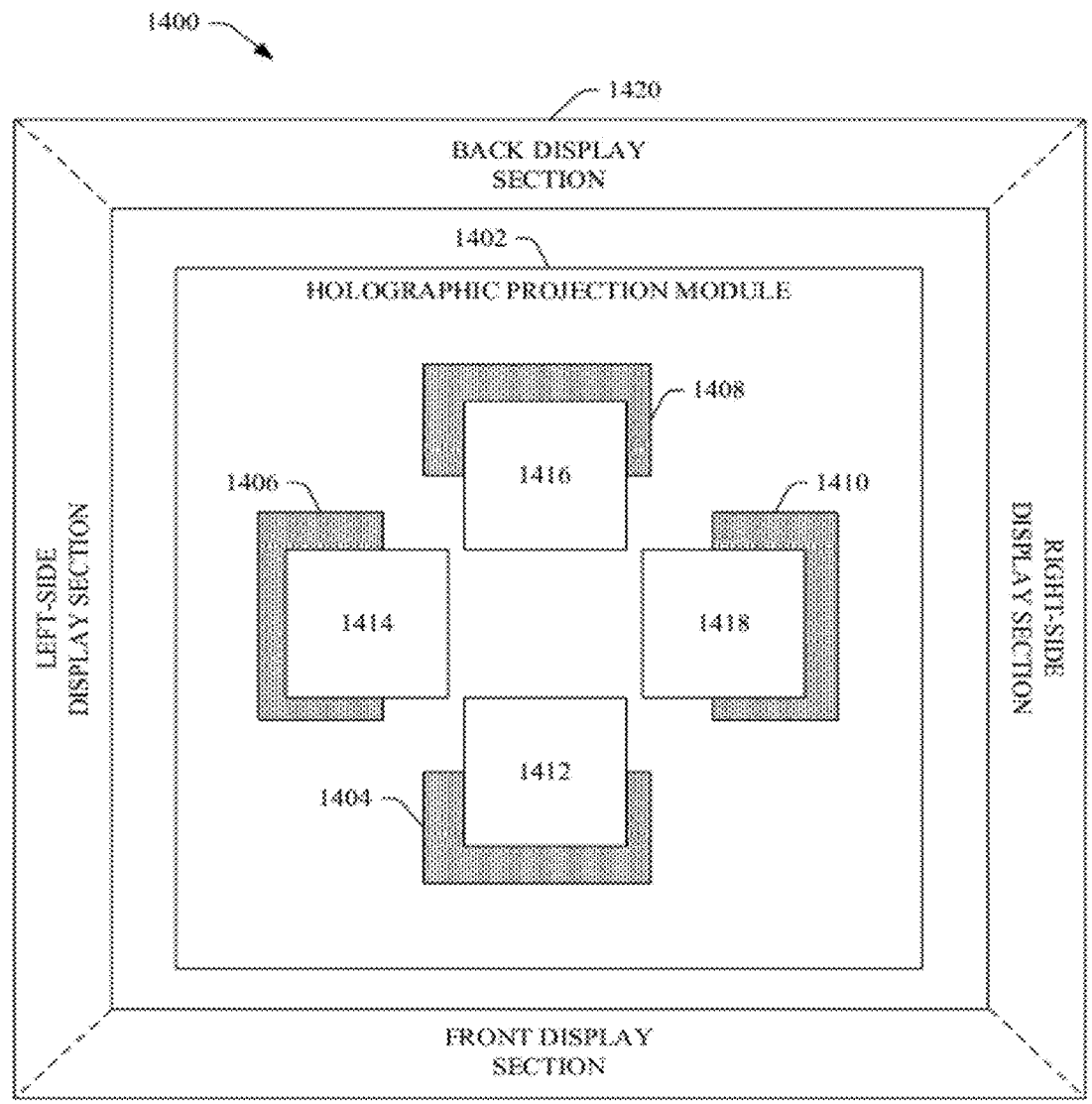
FIG. 14 depicts a diagram of a top view of an example system that can employ multiple display sections (e.g., multiple autostereoscopic displays to form an MSAD) to generate and display a multiple view 3-D holographic image of a scene in accordance with an embodiment of the disclosed subject matter.

Turning to FIG. 14, depicted is a diagram of a top view of an example system 1400 that can employ multiple display sections (e.g., multiple autostereoscopic displays to form an MSAD) to generate and display a multiple view 3-D holographic image of a scene in accordance with an embodiment of the disclosed subject matter. In accordance with an embodiment, the system 1400 can include an HPM 1402 that can comprise a plurality of display components, such as display components 1404, 1406, 1408 and 1410, which each can be autostereoscopic displays and can form an HDS of the HPM 1402. In an aspect, the plurality of display components each can include a display section and a 3-D adapter that can be adhered to the display section (not shown in FIG. 14 for reasons of clarity and brevity; e.g., as shown in FIGS. 11 and 13). The HPM 1402 also can comprise an image generator component and a render component, which are not shown in FIG. 14 for reasons of brevity and clarity.

The plurality of display components, including display components 1404, 1406, 1408 and 1410, can be respectively associated with a plurality of reflector components (e.g., beam splitters), such as reflector components 1412, 1414, 1416 and 1418, that can be arranged at a desired angle (not shown due to FIG. 14 being a top view) with respect to the respective display components to reflect at least a desired portion of the respective 3-D holographic image portions that emerge from the respective display sections (via the respective 3-D adapters) of the display components 1404, 1406, 1408 and 1410 to the display area so that the 3-D holographic image can be displayed for viewing by observers. The HPM 1402, plurality of display components (including display components 1404, 1406, 1408 and 1410), and plurality of reflector components (including reflector components 1412, 1414, 1416 and 1418), the image generator component (not shown), and render component (not shown), each can comprise the same or similar functionality or features, or at least a desired portion thereof, of respective components (e.g. respectively named components), such as more fully described herein.

As more fully disclosed herein, the HPM 1402 can capture, receive, and/or generate visual information relating to a 3-D object scene as viewed from multiple viewing perspectives (e.g., front view, left-side view, back view, and right-side view). The HPM 1402 can generate the 3-D holographic image representative of the 3-D object scene based at least in part on associated holographic data, wherein the 3-D holographic image can reproduce the 3-D aspects, including desired depth information and parallax information, of the 3-D object scene from the multiple viewing perspectives (e.g., front view, left-side view, back view, and right-side view). Respective portions of the 3-D holographic image, which respectively correspond to the respective multiple viewing perspectives, can be displayed by the respective display components 1404, 1406, 1408 and 1410 (e.g., correspondingly front view display section, left-side view display section, back view display section, right-side view display section) (via the respective reflector components 1412, 1414, 1416 and 1418) in the display area 1420, which can be in an area located outside of the HPM 1402, and which can comprise, for example, a front display section, left-side display section, back display section and right-side display section that respectively can display the respective 3-D holographic image portions (e.g., front view 3-D holographic image portion, left-side view 3-D holographic image portion, back view 3-D holographic image portion, right-side view 3-D holographic image portion) projected from the HPM 1402, wherein the respective 3-D holographic image portions can be seamlessly be integrated together in the display area 1420, so that the 3-D holographic image can be viewed by observers, for example, as a whole, integrated 3-D holographic image floating (e.g., aerially) in mid-air.

It is to be appreciated and understood that the while system 1400 is shown with one HPM 1402, four display components 1404, 1406, 1408 and 1410, and four reflector components 1412, 1414, 1416, and 1418, the subject disclosure is not so limited, as there can be virtually any number (e.g., less than four, four, more than four) of HPMs, display components, and/or reflector components, as desired. Further, in accordance with various embodiments, the subject disclosure can comprise an HPM that comprises multiple display components (e.g., a single HPM can include four display components); and/or a single or other desired number of display components can be employed, wherein the display component(s) can comprise more than one display section, wherein each display section can display or project a respective portion of the 3-D holographic image. It is also to be appreciated and understood that the while the display components 1404, 1406, 1408 and 1410 and reflector components 1412, 1414, 1416, and 1418 are depicted as being rectangular in shape, the subject disclosure is not so limited, and the display components and reflector components can be shaped in virtually any desired shape (e.g., triangle, square, rectangle, circular, oval, irregular shape, etc.).

Figure 15:
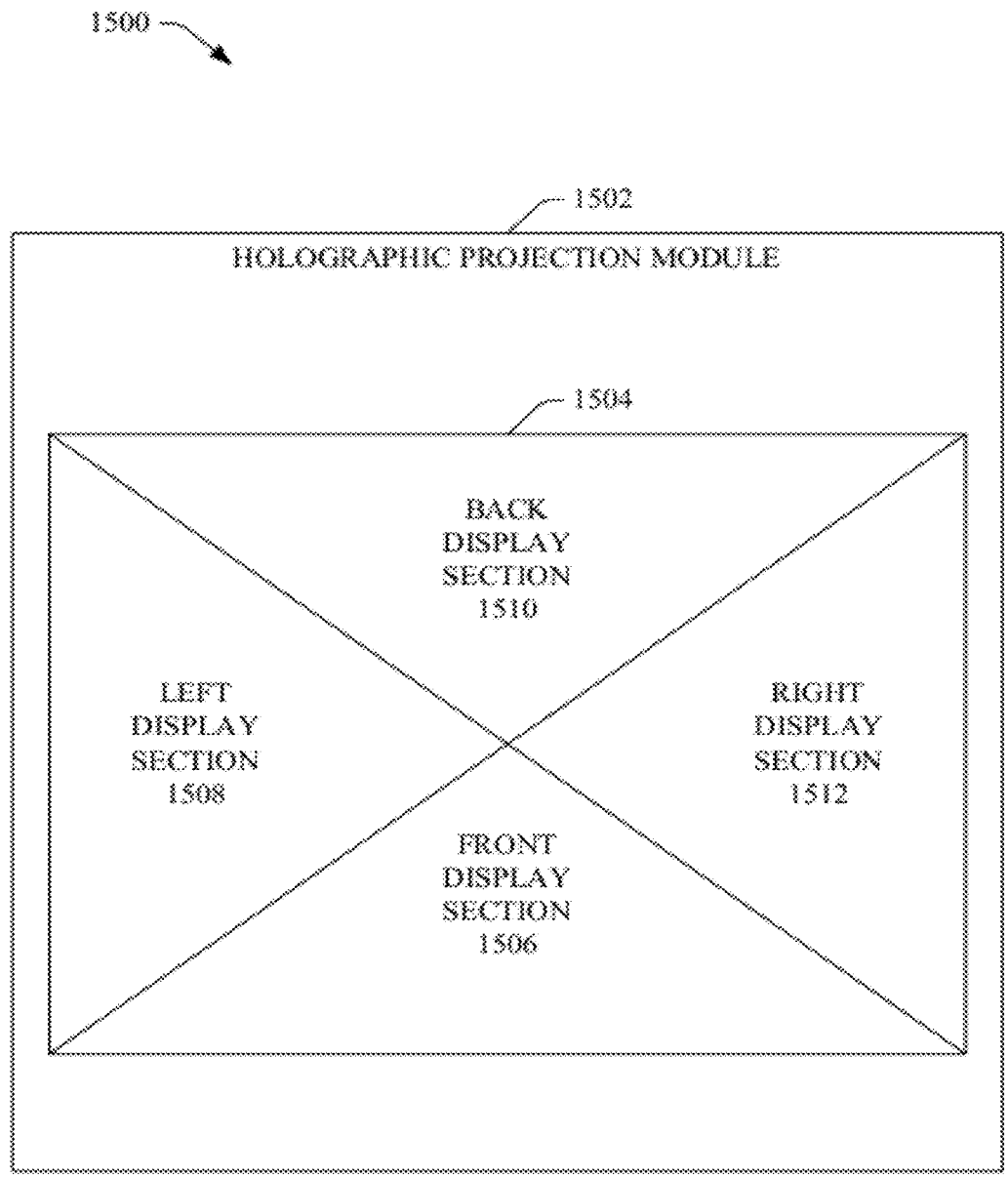
FIG. 15 illustrates a diagram of a top view of an example system that can employ multiple display sections (e.g., multiple autostereoscopic displays to form an MSAD) to generate and display a multiple view 3-D holographic image of a 3-D object scene in accordance with another embodiment of the disclosed subject matter.

FIG. 15 illustrates a diagram of a top view of an example system 1500 that can employ multiple display sections (e.g., multiple autostereoscopic displays to form an MSAD) to generate and display a multiple view 3-D holographic image of a 3-D object scene in accordance with another embodiment of the disclosed subject matter. The system 1500 can include an HPM 1502 that can generate and display a 3-D holographic image that reproduces part (e.g., a frame, a moment in time, a section, a segment) of a 3-D object scene based at least in part on captured, received, and/or generated visual information representative of a 3-D object scene as viewed from multiple viewing perspectives. In an aspect, the HPM 1502 can contain a display component 1504 that can display the 3-D holographic image, which can be projected to a desired display area for viewing by observers. In an embodiment, the display component 1504 can be an autostereoscopic display. The HPM 1502 and the display component 1504 each can comprise the same or similar functionality or features, or at least a desired portion thereof, of respective components (e.g., respectively named components), such as more fully described herein.

In an aspect, the display region (e.g., display screen) of the display component 1504 (e.g., a single electronic accessible display) can be divided into a desired number of display sections, such as, for example, display sections 1506, 1508, 1510 and 1512, having a desired shape(s). For example, if four different viewing perspectives (e.g., front view, left-side view, back view, and right-side view) of a 3-D object scene are to be reproduced as a 3-D holographic image, the display region of the display component 1404 can be divided into four display sections (e.g., front view display section 1406, left-side view display section 1408, back view display section 1410, right-side view display section 1412) with each having a triangular shape, as depicted in FIG. 15. In this example, by partitioning or dividing the display region into four triangular-shaped contiguous display regions, the use of the display region of the display component 1504 can be maximized as the entire display region can be utilized to reproduce the 3-D holographic image. It is to be appreciated and understood, however, that, as desired, the display region can be divided into display sections having different shapes (e.g., triangle, square, rectangle, pentagon, irregular shape, etc.), even if the shapes do not maximize the entire display region as long as the 3-D holographic image can be reproduced by the display component 1504 (e.g., when the 3-D holographic image does not have to utilize the entire display region).

As more fully disclosed herein, the HPM 1502 can capture, receive and/or generate (e.g., generate morphed 2-D images as) visual information relating to a 3-D object scene as viewed from multiple viewing perspectives (e.g., front view, left-side view, back view, and right-side view). The HPM 1502 can generate the 3-D holographic image representative of the 3-D scene based at least in part on associated holographic data, wherein the 3-D holographic image can reproduce the 3-D aspects, including desired depth information and parallax information, of the 3-D scene from the multiple viewing perspectives (e.g., front view, left-side view, back view, and right-side view). Respective portions of the 3-D holographic image, which respectively correspond to the respective multiple viewing perspectives, can be displayed by the respective display sections 1506, 1508, 1510 and 1512 (e.g., front view display section 1506, left-side view display section 1508, back view display section 1510, right-side view display section 1512) (via respective reflector components (not shown in FIG. 15)) in the desired display area so that the 3-D holographic image can be viewed by observers, for example, as a 3-D holographic image floating in mid-air.

It is to be appreciated and understood that the while system 1500 is shown with one HPM 1502, one display component 1504, four display sections 1506, 1508, 1510 and 1512, the subject disclosure is not so limited, as there can be virtually any desired number (e.g., one, two, three, four, more than four) of the HPMs, display components, and/or display sections, as desired. It is also to be appreciated and understood that the while the display component 1504 is depicted as being rectangular in shape and the display sections 1506, 1508, 1510 and 1512 are depicted as being triangular in shape, the subject disclosure is not so limited, and the display component and display sections respectively can be shaped in virtually any desired shape (e.g., triangle, square, rectangle, circular, oval, irregular shape, etc.).

Figure 16:
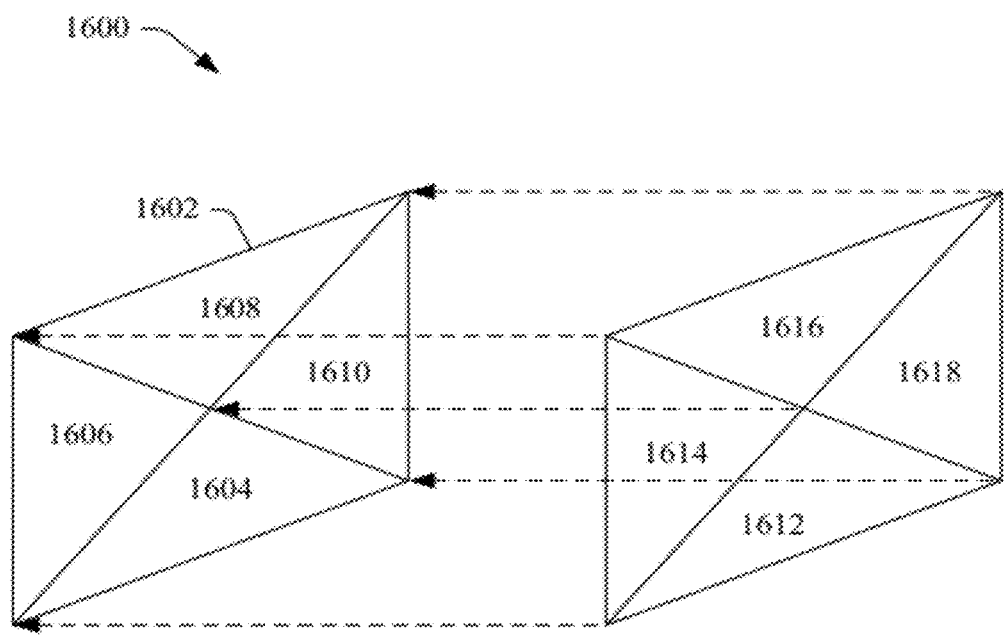
FIG. 16 depicts a diagram of an example system that can employ multiple display sections (e.g., MSAD) to generate and display a multiple-view 3-D holographic image of a 3-D object scene in accordance with an embodiment of the disclosed subject matter.

FIG. 16 depicts a diagram of an example system 1600 that can employ multiple display sections (e.g., MSAD) to generate and display a multiple-view 3-D holographic image of a 3-D object scene in accordance with an embodiment of the disclosed subject matter. The system 1600 can include a display component 1602 that can display a 3-D holographic image as part of a 3-D holographic scene based at least in part on a generated 3-D holographic image reproducing a 3-D object scene from multiple viewing perspectives, wherein the 3-D holographic image, which has corresponding multiple viewing perspectives, can be projected to a desired display area for viewing by observers. In an embodiment, the display component 1602 can be an autostereoscopic display. The display component 1602 can comprise the same or similar functionality or features, or at least a desired portion thereof, of respective components (e.g., respectively named components), such as more fully described herein.

In an aspect, the display region (e.g., display screen) of the display component 1602 (e.g., a single electronic accessible display) can be divided into a desired number of display sections (e.g., HDSs), such as, for example, display sections 1604, 1606, 1608 and 1610, having a desired shape(s). For example, if four different viewing perspectives (e.g., front view, left-side view, back view, and right-side view) of a 3-D object scene are to be reproduced as a 3-D holographic image, the display region of the display component 1602 can be divided into four display sections (e.g., front view display section 1604, left-side view display section 1606, back view display section 1608, right-side view display section 1610) with each having a triangular shape, as depicted in FIG. 16. In this example, by partitioning or dividing the display region into four triangular-shaped contiguous display regions, the use of the display region of the display component 1602 can be maximized as the entire display region of the display component 1602 can be utilized to reproduce the 3-D holographic image. It is to be appreciated and understood, however, that, as desired, the display region can be divided into display sections having different shapes (e.g., triangle, square, rectangle, pentagon, irregular shape, etc.), even if the shapes do not maximize the entire display region as long as the 3-D holographic image can be reproduced by the display component 1602.

In another aspect, the display sections 1604, 1606, 1608 and 1610 each can have adhered thereto a respective 3-D adapter, such as 3-D adapter components 1612, 1614, 1616 and 1618. In accordance with various embodiments, the 3-D adapter components 1612, 1614, 1616 and 1618 each can be a slant or vertical lenticular lens, a slant or vertical parallax barrier (e.g., active parallax barrier), or other desired 3-D adapter.

Figure 17:
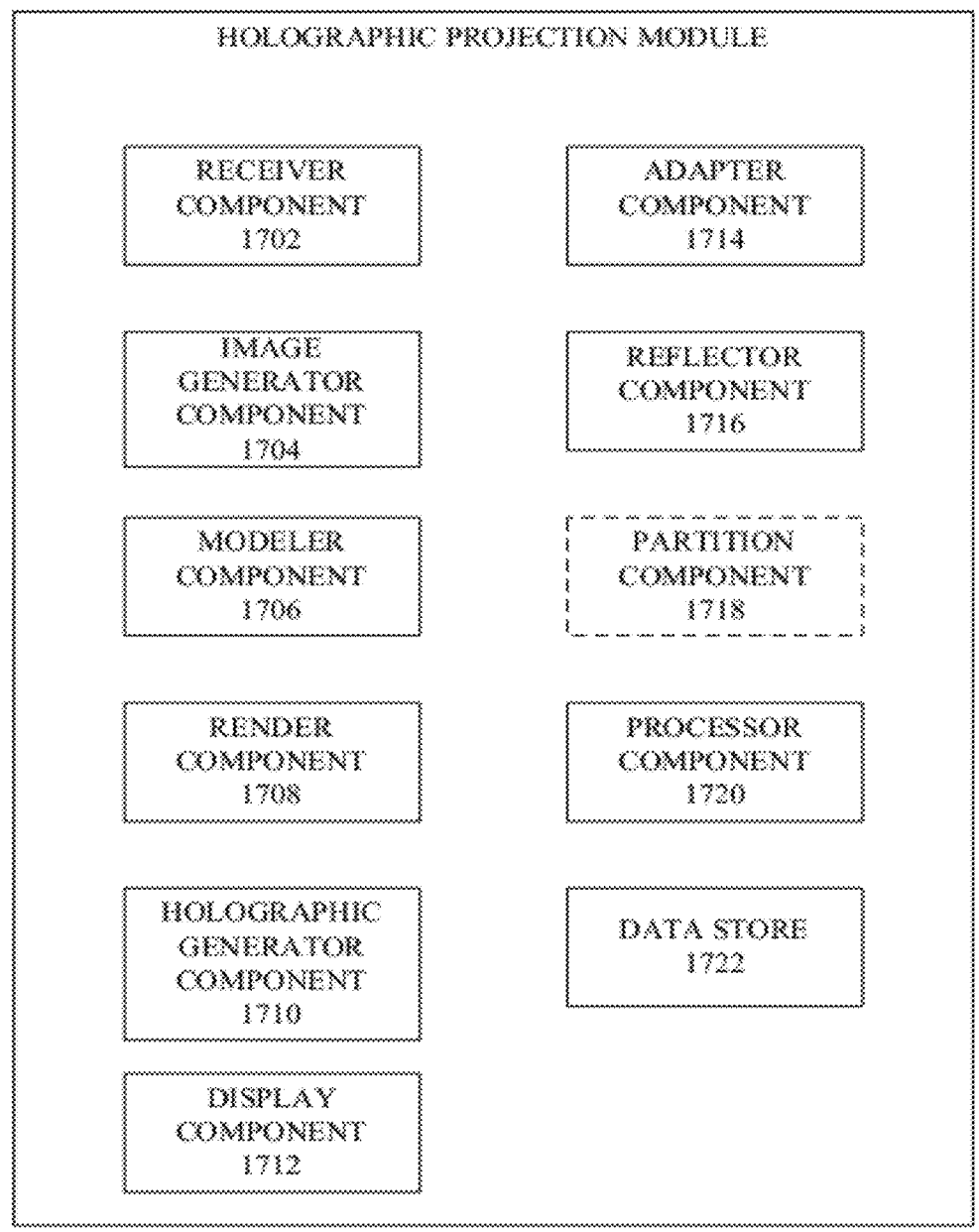
FIG. 17 depicts a block diagram of an example holographic projection module (HPM) in accordance with an aspect of the disclosed subject matter.

Turning to FIG. 17, depicted is a block diagram of an example HPM 1700 in accordance with an aspect of the disclosed subject matter. In an aspect, the HPM 1700 can comprise a receiver component 1702 that can receive information, including visual information associated with a 3-D object scene (e.g., real or synthetic, static or animated, 3-D object scene), parameter information relating to the HPM 1700 or other components associated with the HPM 1700, application information, or other information from other components associated with the HPM 1700.

The HPM 1700 also can contain an image generator component 1704 that can generate one or more 2-D morphed images of respective perspectives of a 3-D object scene image based at least in part on at least one 2-D image have a respective perspective of the 3-D object scene image, as more fully disclosed herein. The image generator component 1704 can employ one or more desired morphing techniques, such as distortion morphing or transition morphing, to facilitate generating the one or more 2-D morphed images.

In another aspect, the HPM 1700 can comprise a modeler component 1706 that can analyze visual information associated with a 3-D object scene (e.g., respective visual information (e.g., captured, synthesized, and/or generated visual information) from different visual perspectives of the 3-D object scene) and can generate model data that can be utilized to create or generate a 3-D model of the 3-D scene, wherein the 3-D model can be representative of the different visual perspectives of the 3-D object scene. In another aspect, the HPM 1700 also can comprise a render component 1708 that can convert the model data associated with the 3-D object scene into corresponding holographic data, which can be used to generate a 3-D holographic image that is a reproduction of a 3-D object scene image of a 3-D object scene and is representative of the different visual perspectives of the 3-D object scene image. The render component 1708 can combine or integrate the respective portions of visual information respectively associated with different perspectives of the 3-D object scene image into an integrated 3-D holographic scene image. Alternatively or additionally, the render component 1708 can generate holographic data based at least in part on the respective visual information from the different visual perspectives of the 3-D object scene to facilitate producing a 3-D holographic scene representative of the 3-D object scene.

In still another aspect, the modeler component 1706 and/or render component 1708 can operate in conjunction with a holographic generator component 1710 to facilitate generation of an off-axis 3-D holographic image of the 3-D object scene, wherein the real part of the off-axis 3-D holographic image can be used to display the 3-D holographic image to a desired observer in the display area. In an aspect, an original 3-D object scene can be composed of a collection of 3-D object points given by $O(x, y, z)=[o_0(x_0, y_0, z_0), o_1(x_1, y_1, z_1), \ldots, o_{N-1}(x_{N-1}, y_{N-1}, z_{N-1})]$. The holographic generator component 1710 can generate an on-axis Fresnel hologram $H_{on}(x,y)$, for example, in accordance with Equation 1, $$H_{on}(x, y) = \sum_{j=0}^{N-1} \frac{a_j}{r_j} \exp(ikr_j) \quad (1)$$

where $k=2\pi/\lambda$ is the wave number of the laser light with $\lambda$ being the wavelength of the laser light. $a_j$ can represent the amplitude of the 'jth' object point, and $r_j = \sqrt{(x_j-x)^2+(y_j-y)^2+z_j^2}$ can be the distance between the object point $(x_j, y_j, z_j)$ and a point $(x,y)$ on the hologram. With regard to Equation (1), it is assumed the hologram is on the x-y plane (e.g., on the z=0 plane) and the object point is at a perpendicular distance $z_j$ away from the hologram. The diffraction patterns of the 3-D object is a superposition of Fresnel zone plates (FZPs) (e.g., the function $\exp(ikr_j)$) each contributed by a unique object point. The process can be interpreted as a numerical realization of holograms generated by optical scanning holography. In another aspect, in accordance with Equation (2), herein, the holographic generator component 1710 can derive or produce an off-axis hologram from $H_{on}(x,y)$ by adding a planar, or a spherical reference beam $B(x,y)$ with certain angle of illumination as $$H(x,y)=H_{on} \cdot B(x,y). \quad (2)$$

To produce the hologram on printed media, such as a photographic film, or display the hologram on electronic accessible device, such as an SLM, the holographic generator component 1710 can facilitate retaining only the real part $H'(x,y)$ of the hologram, in accordance with Equation (3), as given by:

$$H'(x,y)=Re[H(x,y)]. \quad (3)$$

In yet another aspect, the HPM 1700 can include a display component 1712, which can be one or more HDSs and can comprise one or more LCD displays (e.g., high resolution LCD displays), autostereoscopic displays, or other desired displays, that can be used to project or display the 3-D holographic image of the 3-D object scene, wherein respective displays (e.g., HDSs) can display respective portions of the 3-D holographic image, wherein the respective portions being reproductions of different views of the 3-D object scene image, such that the respective portion of the 3-D holographic image can be seamlessly integrated to form a whole, cohesive, integrated 3-D holographic scene image.

In an embodiment, the display component 1712 optionally can include an adapter component 1714 (e.g., 3-D adapter component) that can be, for example, a 3-D adapter that can be utilized to adjust the 3-D holographic image displayed or provided by the display portion(s) of the display component 1712 to improve or enhance the 3-D aspects of the 3-D holographic image displayed by the display component 1712. For instance, the adapter component 1714 can be adhered to or attached to, or placed in proximity to, the display surface of the display component 1712. In accordance with various embodiments, the adapter component 1714 can be a slant or vertical lenticular lens, a slant or vertical parallax barrier (e.g., active parallax barrier), or other desired 3-D adapter. Parameters associated with the adapter component 1714 and the display component 1712 can be adjusted to obtain the desired modification or enhancement of the 3-D holographic image by the adapter component 1714 when displayed by the display component 1712. In accordance with various embodiments, the render component 1708, holographic generator component 1710, display component 1712, and/or adapter component 1714 can be part of a reproductor component.

In accordance with another embodiment, the HPM 1700 can contain a reflector component 1716 that can reflect a 3-D holographic image (e.g., optical waves of the 3-D holographic image), or at least a desired portion thereof, to a desired display area (e.g., 3-D chamber). In an embodiment, the reflector component 1716 can be a beam splitter or other mirror type component for reflecting at least a portion of the 3-D holographic image. The reflector component 1716 can be adjusted so that the angle of the reflector component 1716 in relation to the display component 1712 (and associated adapter component 1714) is at a desired angle to facilitate reflecting the 3-D holographic image to the desired display area (e.g., display area portion thereof). Parameters associated with the reflector component 1716 and the display component 1712 (and associated adapter component 1714) can be adjusted to achieve the desired angle.

In accordance with still another embodiment, the HPM 1700 optionally can comprise a partition component 1718 that can partition or divide the display component 1712 into a desired number of display sections (e.g., HDSs) having a desired shape(s). In an aspect, the partition component 1718 can partition the display surface of the display component 1712 into distinct display sections or display regions wherein respective portions of the 3-D holographic image of respective different viewing perspectives of the 3-D object scene can be displayed by the corresponding display sections of the display component 1712. The partition component 1718 can divide the display of the display component 1712 into a desired number of display sections, based at least in part on the number of different viewing perspectives of the 3-D holographic image to be displayed, and can shape the display sections so as to maximize the use of the display of the display component 1712 based at least in part on the number of display sections in which the display is to be divided. As desired, the partition component 1718 can divide the display into display sections having a shape that less than maximizes use of the display while still enabling desired display of the 3-D holographic image, and/or can divide respective display sections of a display to have a same shape or different shapes.

The HPM 1700 also can comprise a processor component 1720 that can work in conjunction with the other components (e.g., receiver component 1702, image generator component 1704, modeler component 1706, render component 1708, holographic generator component 1710, display component 1712, adapter component 1714, reflector component 1716, (optional) partition component 1718, etc.) to facilitate performing the various functions of the HPM 1700. The processor component 1720 can employ one or more processors, microprocessors, or controllers that can process data, such as information (e.g., visual information) relating to a 3-D object scene, 2-D morphed images, morph-related information (e.g., distortion morphing algorithm(s)), transition morphing algorithm(s), etc.), model data, holographic data, data relating to parameters associated with the HPM 1700 and associated components, etc., to facilitate generating and displaying a 3-D holographic image representative of a 3-D object scene; and can control data flow between the HPM 1700 and other components associated with the HPM 1700.

In yet another aspect, the HPM 1700 can contain a data store 1722 that can store data structures (e.g., user data, metadata); code structure(s) (e.g., modules, objects, classes, procedures), commands, or instructions; information relating to a 3-D object scene; model data; holographic data; 2-D morphed images; morph-related information (e.g., distortion morphing algorithm(s)); parameter data; information relating to display of the 3-D holographic image of the 3-D object scene from multiple views; and so on. In an aspect, the processor component 1720 can be functionally coupled (e.g., through a memory bus) to the data store 1722 in order to store and retrieve information desired to operate and/or confer functionality, at least in part, to the receiver component 1702, image generator component 1704, modeler component 1706, render component 1708, holographic generator component 1710, display component 1712, adapter component 1714, reflector component 1716, (optional) partition component 1718, and/or substantially any other operational aspects of the HPM 1700. It is to be appreciated and understood that the receiver component 1702, image generator component 1704, modeler component 1706, render component 1708, holographic generator component 1710, display component 1712, adapter component 1714, reflector component 1716, (optional) partition component 1718, processor component 1720, and data store 1722 each can be a stand-alone unit, can be included within the HPM 1700 (as depicted), can be incorporated within another component, and/or virtually any suitable combination thereof, as desired.

Figure 18:
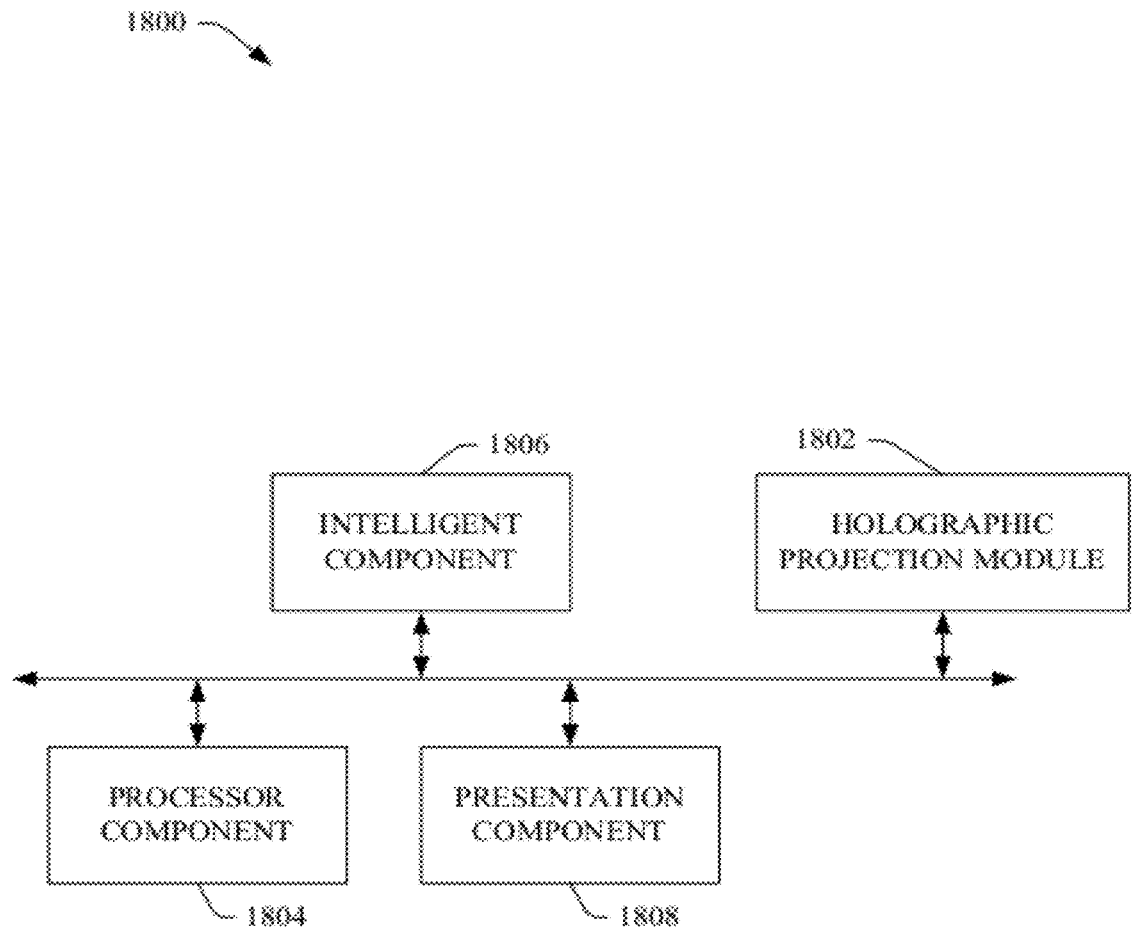
FIG. 18 illustrates a block diagram of a system that can employ intelligence to facilitate generation and display of a multiple-view 3-D holographic image of a 3-D object scene in accordance with an embodiment of the disclosed subject matter.

Referring to FIG. 18, depicted is a block diagram of a system 1800 that can employ intelligence to facilitate generation and display of a multiple-view 3-D holographic image of a 3-D object scene in accordance with an embodiment of the disclosed subject matter. System 1800 can include an HPM 1802 that can obtain visual information of multiple different viewing perspectives of a 3-D object scene and can generate and display a 3-D holographic image of the 3-D object scene from multiple different viewing perspectives corresponding to the multiple different viewing perspectives of a 3-D scene, as more fully disclosed herein. It is to be appreciated that the HPM 1802 can be the same or similar as respective components (e.g., respectively named components), and/or can contain the same or similar functionality as respective components, as more fully described herein.

The system 1800 can further include a processor component 1804 that can be associated with the HPM 1802 and/or other components (e.g., components of system 1800) via a bus. In accordance with an embodiment of the disclosed subject matter, the processor component 1804 can be a typical applications processor(s) that can manage communications and run applications. For example, the processor component 1804 can be a processor that can be utilized by a computer, mobile computing device, personal data assistant (PDA), or other electronic computing device. The processor component 1804 can generate commands in order to facilitate generating and displaying a 3-D holographic image of the 3-D object scene from multiple different viewing perspectives corresponding to the multiple different viewing perspectives of a 3-D scene obtained by the HPM 1802, modifying parameters associated with the HPM 1802, etc.

The system 1800 also can include an intelligent component 1806 that can be associated with the HPM 1802, the processor component 1804, and/or other components associated with system 1800 to facilitate analyzing data, such as current and/or historical information, and, based at least in part on such information, can make an inference(s) and/or a determination(s) regarding, for example, generation of a 3-D holographic image based at least in part on a 3-D object scene, a morphing technique to apply in relation to a 2-D image(s) of a 3-D object scene to facilitate generating one or more 2-D morphed images, a subset of points (e.g., fixed points, morph seed points, morph target points, primary or corresponding transition points, etc.) associated with generating one or more 2-D morphed images, a type of morphing technique to employ, setting of parameters associated with the HPM 1802 and associated components, dividing a display of a display component into display sections, the shape(s) of display sections of a divided display, etc.

For example, based in part on current and/or historical evidence, the intelligent component 1806 can infer that a morphing technique to apply in relation to a 2-D image(s) of a 3-D object scene to facilitate generating one or more 2-D morphed images, selection of a subset of points (e.g., fixed points, morph seed points, morph target points, primary or corresponding transition points, etc.) associated with generating one or more 2-D morphed images, selection of a type of morphing technique to employ, modification of a 3-D holographic image of a 3-D object scene to facilitate improving or enhancing display of the 3-D holographic image, respective parameter values of one or more parameters associated with the display component, reflector component or 3-D adapter component be adjusted to facilitate improving or enhancing display of the 3-D holographic image, etc.

In an aspect, the intelligent component 1806 can communicate information related to the inferences and/or determinations to the HPM 1802. Based at least in part on the inference with respect to such data by the intelligent component 1806, the HPM 1802 can take (e.g., automatically or dynamically take) one or more actions to facilitate generating and displaying a 3-D holographic image of the 3-D object scene from multiple different viewing perspectives corresponding to the multiple different viewing perspectives of a 3-D object scene obtained by the HPM 1802, etc.

It is to be understood that the intelligent component 1806 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x_1, x_2, x_3, x_4, x_n)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1800 also can include a presentation component 1808, which can be connected with the processor component 1104. The presentation component 1808 can provide various types of user interfaces to facilitate interaction between a user and any component coupled to the processor component 1804. As depicted, the presentation component 1808 is a separate entity that can be utilized with the processor component 1804 and associated components. However, it is to be appreciated that the presentation component 1808 and/or similar view components can be incorporated into the processor component 1804 and/or a stand-alone unit. The presentation component 1808 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1804.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HPM 1802 and/or other components, can be situated or implemented on a single integrated-circuit chip. In accordance with another embodiment, the HPM 1802, and/or other components, can be implemented on an application-specific integrated-circuit (ASIC) chip. In yet another embodiment, the HPM 1802 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 19-22 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 19:
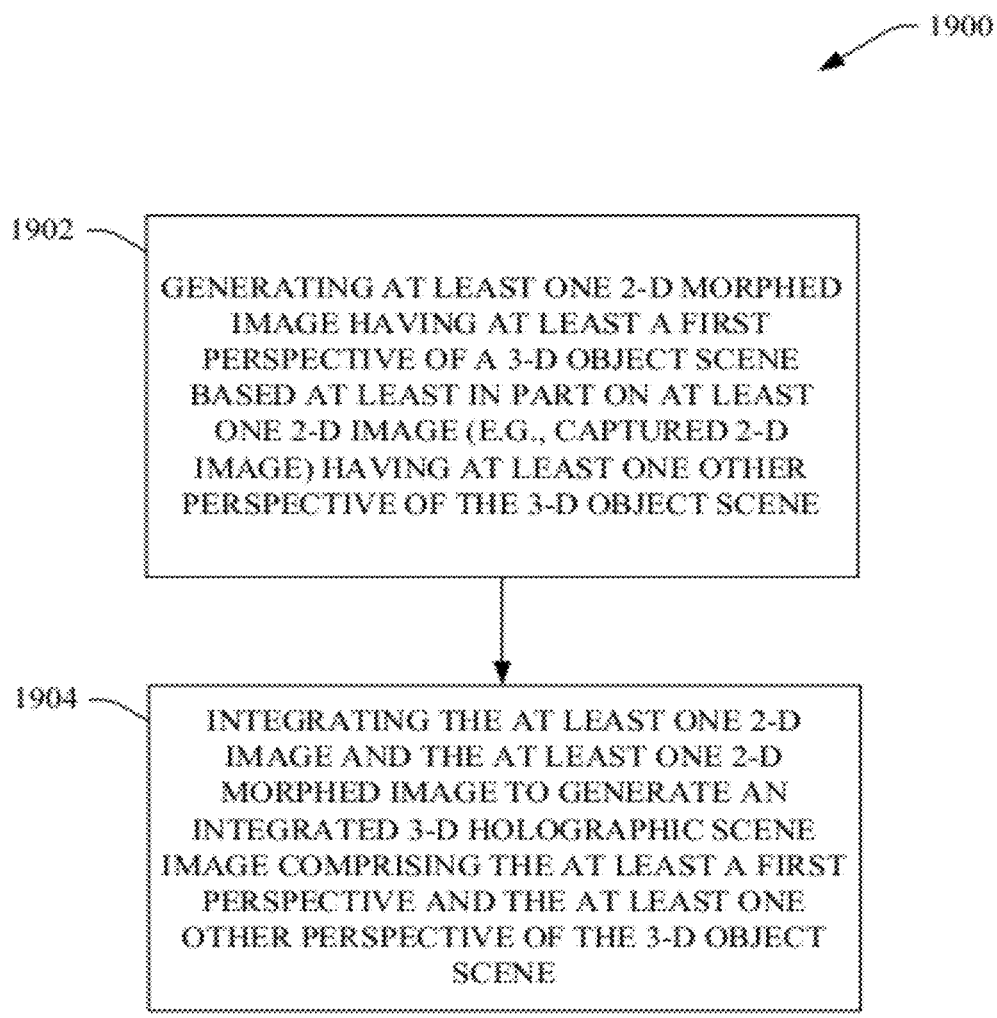
FIG. 19 illustrates a flow diagram of an example method for generating one or more morphed images associated with a 3-D object scene to facilitate generation and display of a multi-view 3-D holographic image of a 3-D object scene in accordance with various embodiments and aspects of the disclosed subject matter.

Referring to FIG. 19, illustrated is an example method 1900 for generating one or more morphed images associated with a 3-D object scene to facilitate generation and display of a multi-view 3-D holographic image of a 3-D object scene in accordance with various embodiments and aspects of the disclosed subject matter. At 1902, at least one 2-D morphed image having at least a first perspective of a 3-D object scene can be generated based at least in part on at least one 2-D image (e.g., captured 2-D image) having at least one other perspective of the 3-D object scene. The at least one 2-D image, as indicated, can be as little as one 2-D image of a portion (e.g., a moment in time) of a 3-D object scene. The 3-D object scene can be real or synthesized (e.g., computer synthesized), and static or animated, as desired.

At 1904, the at least one 2-D image and the at least one 2-D morphed image can be integrated to generate an integrated 3-D holographic scene image comprising the at least a first perspective and the at least one other perspective of the 3-D object scene. The integrated 3-D holographic scene image can be provided to a display component, comprising an autostereoscopic display and associated 3-D adapter, and the display component can display the integrated 3-D holographic scene image, and a viewer can observe the integrated 3-D holographic scene image from a variety of perspectives (e.g., by walking around the display area, wherein the integrated 3-D holographic scene image is displayed).

Figure 20:
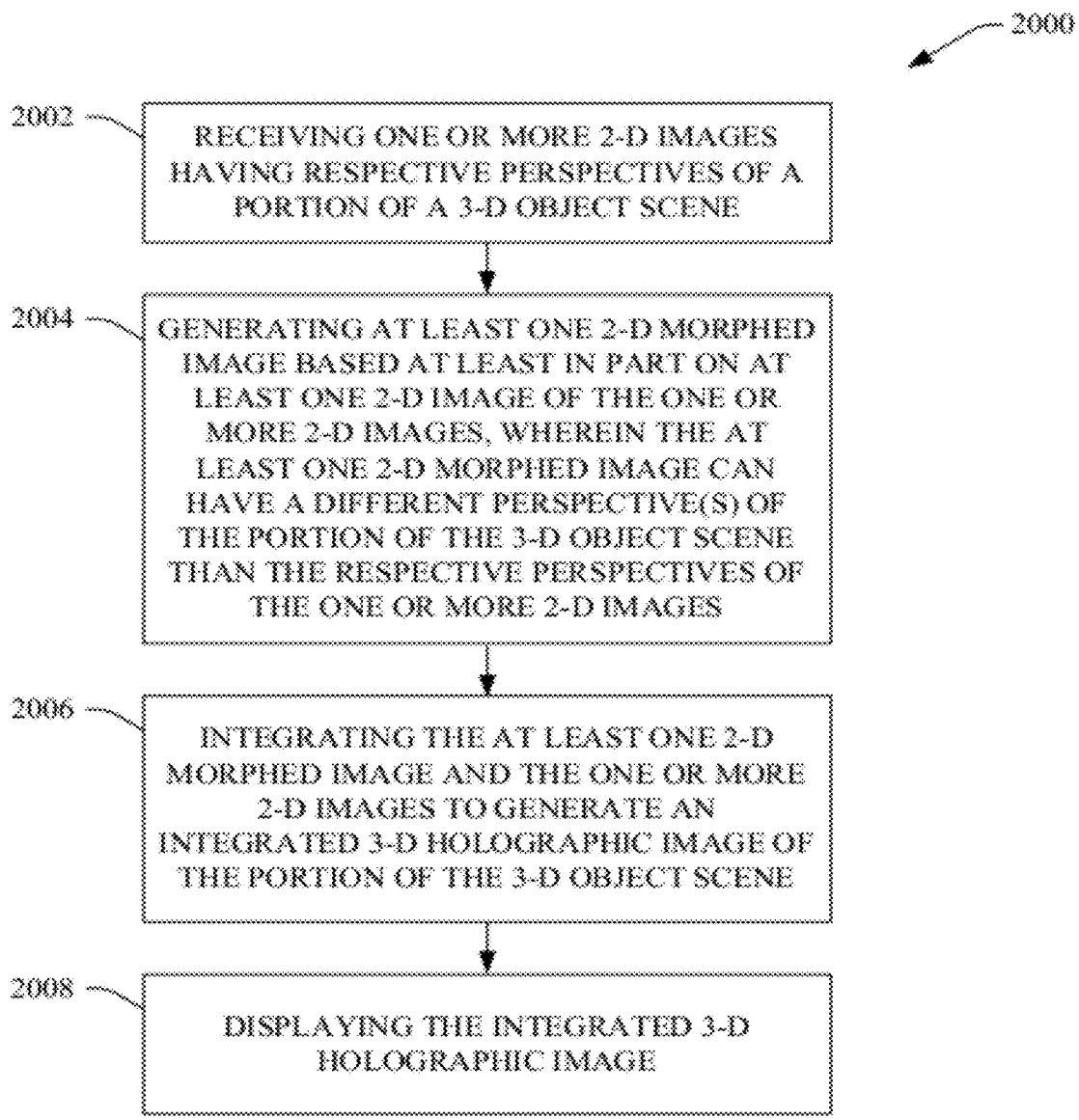
FIG. 20 depicts another example method for generating one or more morphed images associated with a 3-D object scene to facilitate generation and display of a multi-view 3-D holographic image of a 3-D object scene in accordance with various embodiments and aspects of the disclosed subject matter.

Turning to FIG. 20, illustrated is a flow diagram of another example method 2000 for generating one or more morphed images associated with a 3-D object scene to facilitate generation and display of a multi-view 3-D holographic image of a 3-D object scene in accordance with various embodiments and aspects of the disclosed subject matter. At 2002, one or more 2-D images having respective perspectives of a portion (e.g., a frame, a moment in time, a section, a segment) of a 3-D object scene can be received. The one or more 2-D images can be captured 2-D images, or some or all of the one or more 2-D images can be synthesized 2-D images.

At 2004, at least one 2-D morphed image can be generated based at least in part on at least one 2-D image of the one or more 2-D images, wherein the at least one 2-D morphed image can have a different perspective(s) of the portion of the 3-D object scene than the respective perspectives of the one or more 2-D images. Distortion morphing or transition morphing techniques can be employed to generate the at least one 2-D morphed image based at least in part on the at least one 2-D image, as more fully disclosed herein.

At 2006, the at least one 2-D morphed image and the one or more 2-D images can be integrated to generate an integrated 3-D holographic image of the portion of the 3-D object scene, wherein the 3-D holographic image comprise the respective perspectives of the portion of the 3-D object scene respectively associated with the one or more 2-D images and the different perspective(s) of the portion of the 3-D object scene associated with the at least one 2-D morphed image.

At 2008, the integrated 3-D holographic image can be displayed. In an aspect, a display component can comprise an autostereoscopic display and associated 3-D adapter (e.g., active parallax barrier), and the display component can display the integrated 3-D holographic scene image, and a viewer can observe the integrated 3-D holographic scene image from a variety of perspectives.

Figure 21:
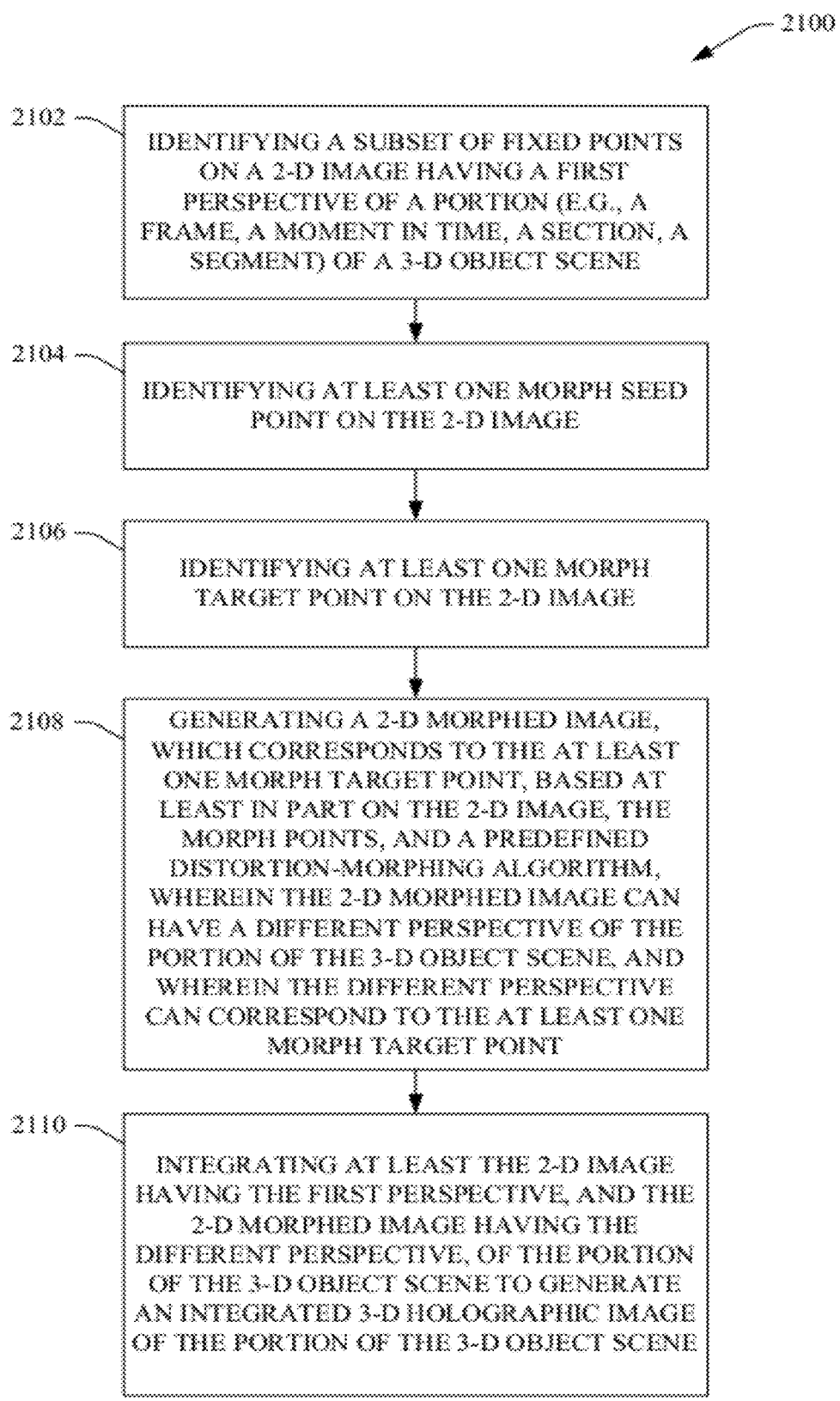
FIG. 21 depicts a flow diagram of an example method for generating one or more distortion-morphed images associated with a 3-D object scene to facilitate generation and display of a multi-view 3-D holographic image of a 3-D object scene in accordance with various embodiments and aspects of the disclosed subject matter.

FIG. 21 depicts an example method 2100 for generating one or more distortion-morphed images associated with a 3-D object scene to facilitate generation and display of a multi-view 3-D holographic image of a 3-D object scene in accordance with various embodiments and aspects of the disclosed subject matter. At 2102, a subset of fixed points can be identified on a 2-D image having a first perspective of a portion (e.g., a frame, a moment in time, a section, a segment) of a 3-D object scene.

At 2104, at least one morph seed point can be identified on the 2-D image. The at least one morph seed point can be located in a desired location on the 2-D image. At 2106, at least one morph target point can be identified on the 2-D image. The at least one morph target point can be located in a desired location on the 2-D image, wherein the location of the at least one morph target point is typically relatively near the morph seed point. The at least one morph target point can correspond to a different (e.g., second) perspective of the portion of the 3-D object scene than the first perspective. As there often can be multiple morph seed points and multiple morph target points, a morph target point can be associated with a corresponding morph seed point, so that the generated morphed image will have the object features morphed properly. The various morph points (e.g., fixed point, morph seed point, morph target point) can be generated automatically or manually (e.g., by a user). For example, potential morph points can be automatically generated, wherein the potential morph points can be modified by the user, if desired, and a finalized set of morph points can be selected (e.g., by the user).

At 2108, a 2-D morphed image, which corresponds to the at least one morph target point, can be generated based at least in part on the 2-D image, the morph points, and a predefined distortion-morphing algorithm, wherein the 2-D morphed image can have a different perspective of the portion of the 3-D object scene, and wherein the different perspective can correspond to the at least one morph target point. The 2-D image and associated set of morph points can be analyzed (e.g., by the image generator component), and the predefined distortion-morphing algorithm can be applied to the analysis results to facilitate generating the 2-D morphed image.

For instance, the features of the 2-D image (e.g., features of object(s) in the image), and the respective locations of the different morph points (e.g., location of a morph seed point on the 2-D image in relation to an object feature(s), location of a morph seed point in relation to an associated morph target point, etc.), can be analyzed to identify what the features of the object(s) in the 2-D image are to look like (e.g., identify the structure of the features of the object(s) in the 2-D image) as viewed from the different perspective associated with the at least one morph target point, as more fully disclosed herein. That is, in an aspect, the 2-D distortion-morphed image can depict the object features of objects in the image from the different perspective in the 3-D object scene with the object features having the modified or morphed geospatial characteristics and/or optical or structural characteristics that those object features would have had an actual 2-D image of the different perspective been captured, as more fully disclosed herein.

At 2110, at least the 2-D image having the first perspective, and the 2-D morphed image having the different perspective, of the portion of the 3-D object scene can be integrated to generate an integrated 3-D holographic image of the portion of the 3-D object scene. For instance, the 2-D image of the first perspective, the 2-D morphed image of the different perspective, and other 2-D images (if any) of other respective perspectives, of the portion of the 3-D object scene can be integrated to generate the 3-D holographic image of the portion of the 3-D object scene, as more fully disclosed herein.

Figure 22:
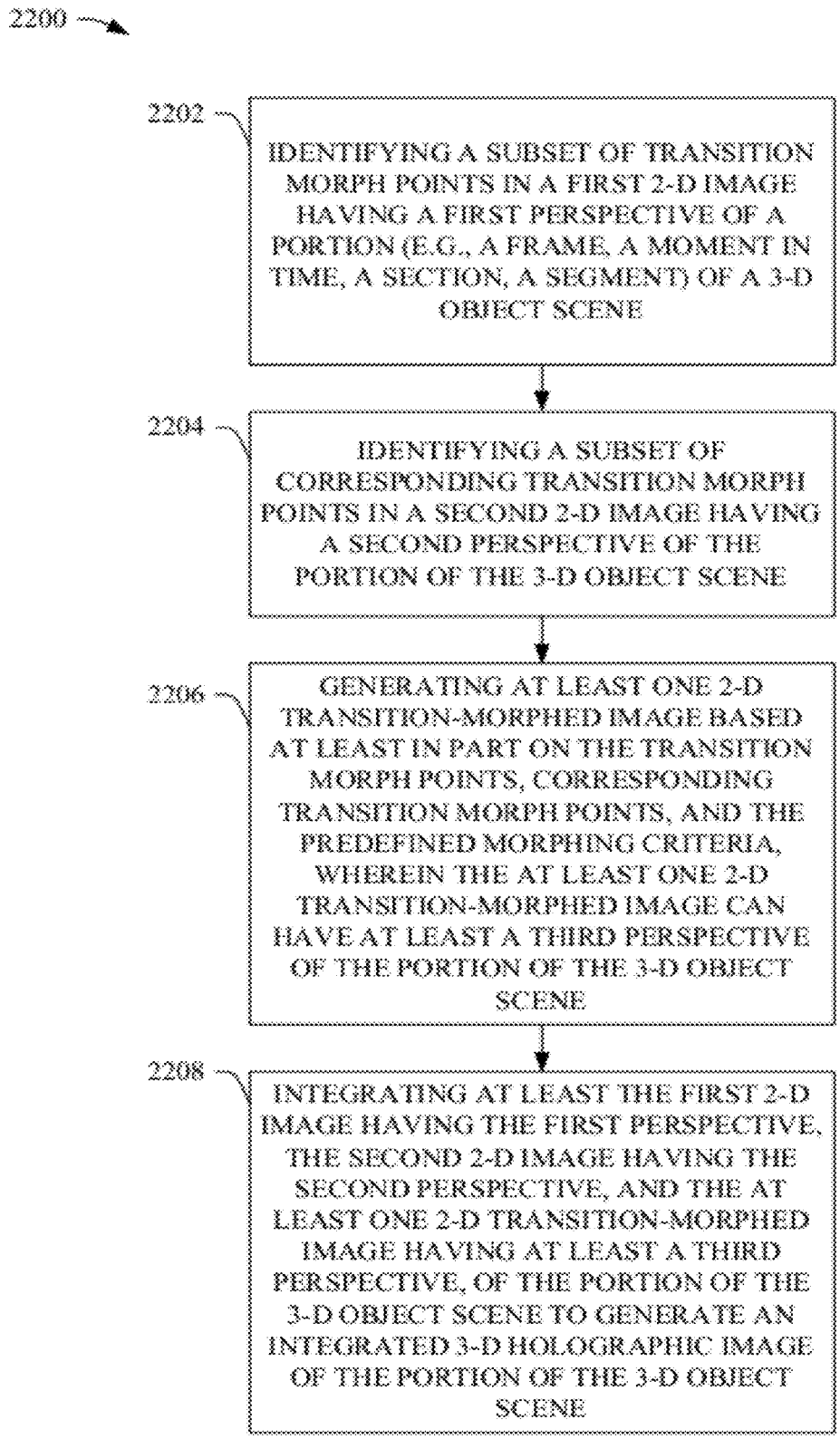
FIG. 22 illustrates a flow diagram of an example method for generating one or more transition-morphed images associated with a 3-D object scene to facilitate generation and display of a multi-view 3-D holographic image of a 3-D object scene in accordance with various embodiments and aspects of the disclosed subject matter.

FIG. 22 illustrates an example method 2200 for generating one or more transition-morphed images associated with a 3-D object scene to facilitate generation and display of a multi-view 3-D holographic image of a 3-D object scene in accordance with various embodiments and aspects of the disclosed subject matter. At 2202, a subset of transition morph points can be identified in a first 2-D image having a first perspective of a portion (e.g., a frame, a moment in time, a section, a segment) of a 3-D object scene. The subset of transition morph points (e.g., primary transition morph points) can be virtually any desired number of such points. A transition morph point can be associated with or located at an identifiable feature (e.g., end of nose, eye, chin, ear, end of an object, etc.) of an object (e.g., person, inanimate object, etc.) in the first 2-D image.

At 2204, a subset of corresponding transition morph points can be identified in a second 2-D image having a second perspective of the portion of the 3-D object scene. Each of the corresponding transition morph points can respectively correspond to, and be associated with (e.g., tagged to, linked to, connected to), the transition morph points, and the placement or insertion of a corresponding transition morph point in relation to an identifiable feature of an object in the second 2-D image can be the same, or at least substantially the same, as the placement or insertion of the associated transition morph point in relation to the identifiable feature of the object in the first 2-D image, even if (and particularly if) the identifiable feature is located in a different location in the second 2-D image, as more fully disclosed herein.

At 2206, at least one 2-D transition-morphed image can be generated (e.g., automatically) based at least in part on the transition morph points, corresponding transition morph points, and the predefined morphing criteria, wherein the at least one 2-D transition-morphed image can have at least a third perspective of the portion of the 3-D object scene, and wherein the at least a third perspective is a perspective that is in between the first perspective and the second perspective of the portion of the 3-D object scene. In an aspect, the at least one 2-D transition-morphed image can depict the object features of objects from the third perspective in the 3-D object scene with the object features having the modified or morphed geospatial characteristics and/or optical or structural characteristics that those object features would have had an actual 2-D image of the third perspective been captured, as more fully disclosed herein.

At 2208, at least the first 2-D image having the first perspective, the second 2-D image having the second perspective, and the at least one 2-D transition-morphed image having at least a third perspective, of the portion of the 3-D object scene can be integrated to generate an integrated 3-D holographic image of the portion of the 3-D object scene. For instance, the first 2-D image of the first perspective, the second 2-D image of the first perspective, the 2-D transition-morphed image of the at least a third perspective, and other 2-D images (if any) of other respective perspectives, of the portion of the 3-D object scene can be integrated to generate the 3-D holographic image of the portion of the 3-D object scene, as more fully disclosed herein.

Figure 23:
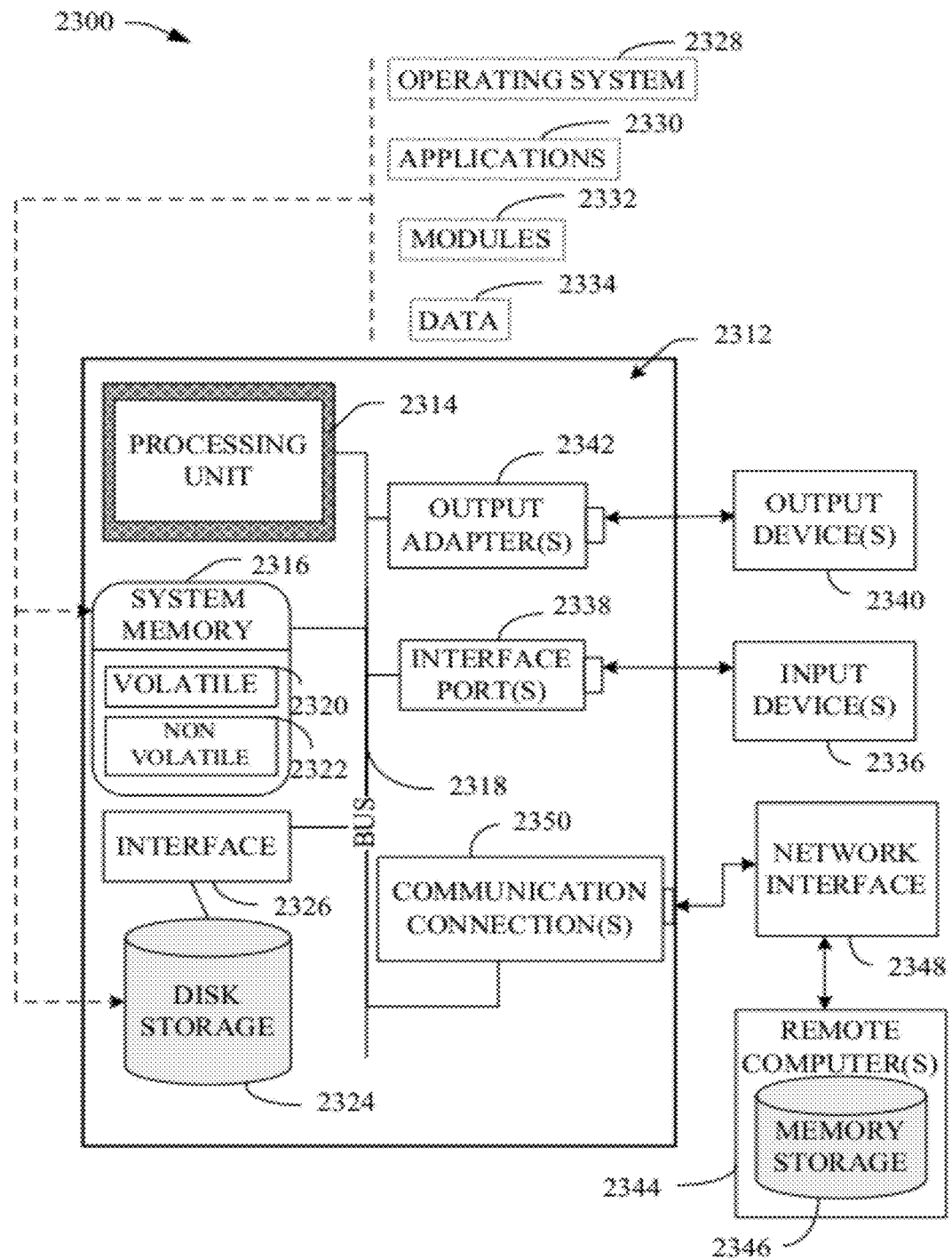
FIG. 23 is a schematic block diagram illustrating a suitable operating environment.
Figure 24:
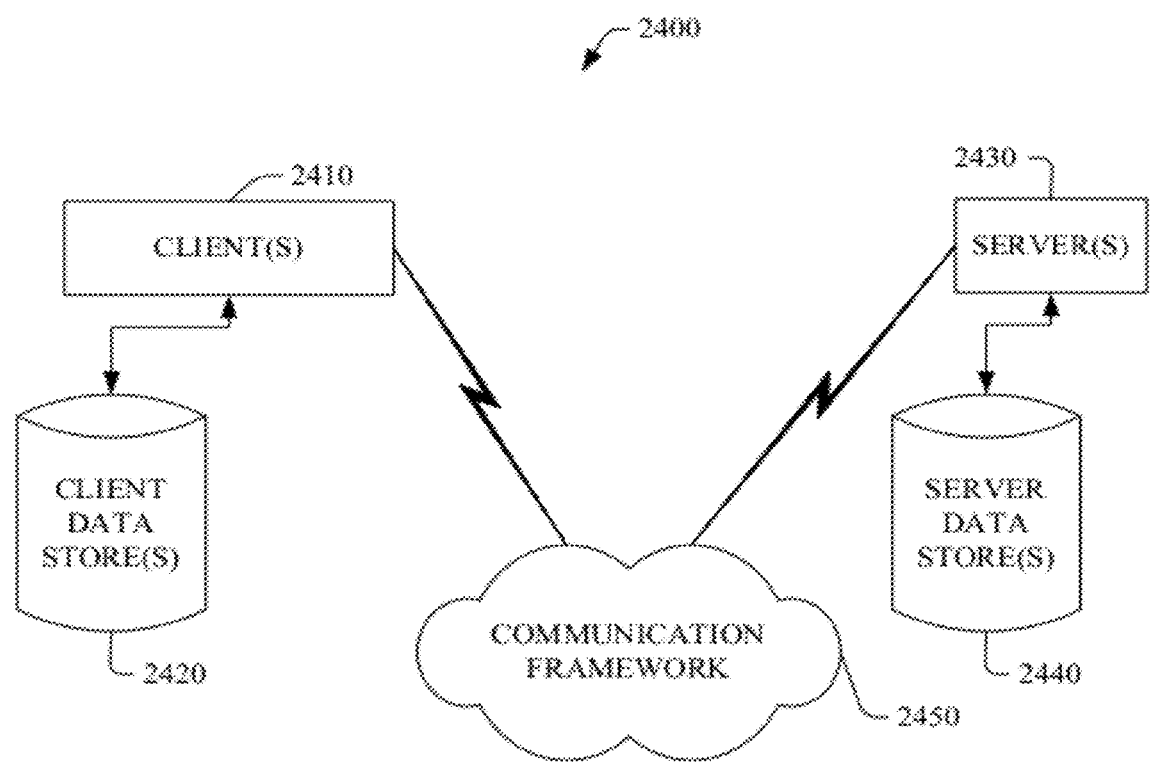
FIG. 24 is a schematic block diagram of a sample-computing environment.

In order to provide a context for the various aspects of the disclosed subject matter, FIGS. 23 and 24 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 23, a suitable environment 2300 for implementing various aspects of the claimed subject matter includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Dual microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable programmable ROM (EEPROM), or flash memory. Volatile memory 2320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2312 also includes removable/non-removable, volatile/non-volatile computer storage media. FIG. 23 illustrates, for example, a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to the system bus 2318, a removable or non-removable interface is typically used, such as interface 2326).

It is to be appreciated that FIG. 23 describes software that acts as an intermediary between users and the basic computer resources described in the suitable operating environment 2300. Such software includes an operating system 2328. Operating system 2328, which can be stored on disk storage 2324, acts to control and allocate resources of the computer system 2312. System applications 2330 take advantage of the management of resources by operating system 2328 through program modules 2332 and program data 2334 stored either in system memory 2316 or on disk storage 2324. It is to be appreciated that the claimed subject matter can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapter 2342 is provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refers to the hardware/software employed to connect the network interface 2348 to the bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

FIG. 24 is a schematic block diagram of a sample-computing environment 2400 with which the subject disclosure can interact. The system 2400 includes one or more client(s) 2410. The client(s) 2410 can be hardware and/or software (e.g., threads, processes, computing devices). The system 2400 also includes one or more server(s) 2430. Thus, system 2400 can correspond to a two-tier client server model or a multi-tier model (e.g., client, middle tier server, data server), amongst other models. The server(s) 2430 can also be hardware and/or software (e.g., threads, processes, computing devices). The servers 2430 can house threads to perform transformations by employing the subject disclosure, for example. One possible communication between a client 2410 and a server 2430 may be in the form of a data packet transmitted between two or more computer processes.

The system 2400 includes a communication framework 2450 that can be employed to facilitate communications between the client(s) 2410 and the server(s) 2430. The client(s) 2410 are operatively connected to one or more client data store(s) 2420 that can be employed to store information local to the client(s) 2410. Similarly, the server(s) 2430 are operatively connected to one or more server data store(s) 2440 that can be employed to store information local to the servers 2430.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a processor, coupled to a memory, that facilitates execution of computer-executable components, comprising:
an image generator component configured to generate a two-dimensional (2-D) morphed image of a section of a three-dimensional (3-D) object scene based at in part on at least one 2-D image of at least a first perspective of the section of the 3-D object scene, wherein the 2-D morphed image is generated from a different viewing perspective of the section of the 3-D object scene; and a render component configured to integrate at least the 2-D morphed image and the at least one 2-D image to generate an integrated 3-D holographic image of the section of the 3-D object scene based at least in part on holographic data associated with the 2-D morphed image and the at least one 2-D image, wherein the integrated 3-D holographic image comprises first depth information and first disparity information associated with the at least one 2-D image of the first viewing perspective, and different depth information and second disparity information associated with the 2-D morphed image generated from the different viewing perspective.

2. The system of claim 1, wherein the computer-executable components further comprise:
a hologram projection module (HPM) configured to include at least the image generator component, and generate the first depth information and the first disparity information associated with at least the at least one 2-D image of at least the first viewing perspective, and the different depth information and the different disparity information associated with the 2-D morphed image of the different viewing perspective to facilitate generation of the integrated 3-D holographic image comprising visual quality wherein, when displayed, the integrated 3-D holographic image of the section of the 3-D object scene depicts together at least the 2-D morphed image of the different viewing perspective and the at least one 2-D image of at least the first viewing perspective of the section of the 3-D object scene based at least in part on the first depth information, the first disparity information, the different depth information, and the different disparity information.

3. The system of claim 1, wherein the at least one 2-D image is a single 2-D image, and the image generator component is configured to generate at least two 2-D morphed images from respective different viewing perspectives of the section of the 3-D object scene.

4. The system of claim 1, wherein the image generator component is further configured to perform at least one of a distortion morph or a transition morph in connection with the at least one 2-D image to generate the 2-D morphed image of the different viewing perspective of the section of the 3-D object scene.

5. The system of claim 4, wherein, in performance of the distortion morph, the image generator component is further configured to identify and select a subset of fixed points, a subset of morph seed points, and a subset of morph target points associated with the at least one 2-D image, wherein the subset of morph target points correspond to the different viewing perspective of the section of the 3-D object scene.

6. The system of claim 5, the image generator component is further configured to generate the 2-D morphed image via morph of at least one object in the at least one 2-D image, wherein at least one of a geospatial characteristic or an optical characteristic of the at least one object, as originally depicted in the at least one 2-D image, is modified in the 2-D morphed image to correspond to the different viewing perspective of the section of the 3-D object scene.

7. The system of claim 4, wherein the at least one 2-D image comprises a first 2-D image of the first viewing perspective and a second 2-D image of a second viewing perspective of the section of the 3-D object scene, and wherein, in performance of the transition morph, the image generator component is further configured to identify and select a subset of primary morph transition points in the first 2-D image, and a subset of corresponding morph transition points in the second 2-D image, wherein respective primary morph transition points are associated with respective corresponding morph transition points.

8. The system of claim 7, wherein the image generator component is further configured to generate the 2-D morphed image via morph of at least one object in the at least one 2-D image, wherein at least one of a geospatial characteristic or an optical characteristic of the at least one object is transitioned to be at least one of a modified geospatial characteristic or a modified optical characteristic of the at least one object, wherein the at least one of the modified geospatial characteristic or the modified optical characteristic of the at least one object depicts the at least one object from the different viewing perspective of the section of the 3-D object scene.

9. The system of claim 4, wherein the image generator component is further configured to perform a hybrid morph, wherein the image generator component generates a 2-D distortion-morphed image of a second perspective of the section of the 3-D object scene based at least in part on the at least one 2-D image, and generates a 2-D transition-morphed image of a third viewing perspective of the section of the 3-D object scene based at least in part on the at least one 2-D image and the 2-D distortion-morphed image.

10. The system of claim 1, wherein the 3-D object scene is at least one of static or animated, and at least one of real or synthetic.

11. The system of claim 1, further comprising:
at least one display component configured to comprise a specified number of respective display sections based at least in part on a number of the respective viewing perspectives associated with the 3-D object scene, wherein the respective display sections display respective portions of the integrated 3-D holographic image that correspond to the respective viewing perspectives associated with the 3-D object scene.

12. The system of claim 11, wherein the at least one display component is further configured to comprise at least one of a liquid crystal display, a spatial light modulator, or an autostereoscopic display, wherein the at least one display component is configured to display the integrated 3-D holographic image in at least one of monochrome or color.

13. The system of claim 11, wherein the at least one display component is configured to comprise an autostereoscopic display comprising a display screen that is partitioned into a specified number of display sections having a specified shape based at least in part on the specified number of display sections, wherein the specified shape is selected wherein the display area of the display sections is maximized.

14. The system of claim 13, further comprising:
a specified number of 3-D adapter components that are configured to be respectively adhered to the specified number of display sections, wherein the 3-D adapter components are configured to modify the respective portions of the integrated 3-D holographic image to enhance the respective portions of the integrated 3-D holographic image, and wherein the 3-D adapter components are at least one of a slant lenticular lens, vertical lenticular lens, a slant parallax barrier, or vertical parallax barrier.

15. The system of claim 11, further comprising:
a specified number of respective reflector components configured to reflect at least a portion of the respective portions of the integrated 3-D holographic image to display the integrated 3-D holographic image in a display area to facilitate viewing of the integrated 3-D holographic image by at least one observer, wherein different viewing perspectives of the integrated 3-D image are perceivable by the at least one observer as the at least one observer changes viewing perspective in relation to the integrated 3-D holographic image.

16. A method, comprising:
generating, by a system comprising a processor, at least one two-dimensional (2-D) morphed image of at least one viewing perspective of a segment of a three-dimensional (3-D) object scene based at least in part on at least one 2-D image having at least one other viewing perspective of the segment of the 3-D object scene; and
integrating, the at least one 2-D image and the at least one 2-D morphed image, based at least in part on holographic data associated with the at least one 2-D image and the at least one 2-D morphed image, to generate an integrated 3-D holographic scene image comprising at least the one viewing perspective and the at least one other viewing perspective of the segment of the 3-D object scene, wherein the integrated 3-D holographic scene image comprises first depth information and first disparity information associated with the at least one 2-D image of the at least one other viewing perspective, and different depth information and different disparity information associated with the at least one 2-D morphed image generated from the at least one viewing perspective.

17. The method of claim 16, further comprising:
receiving, by the system, one or more 2-D images having respective viewing perspectives of the segment of the 3-D object scene, wherein the one or more 2-D images comprises the at least one 2-D image, and wherein the 3-D object scene is at least one of static or animated, and at least one of real or synthetic.

18. The method of claim 16, further comprising:
capturing, by the system, the at least one 2-D image from the 3-D object scene, wherein the 3-D object scene is a real 3-D object scene, and wherein the at least one 2-D image is a single 2-D image.

19. The method of claim 18, further comprising:
generating, by the system, an animated sequence of integrated 3-D holographic scene images of the 3-D object scene based at least in part on the single 2-D image, wherein the animated sequence of integrated 3-D holographic scene images comprises the integrated 3-D holographic scene image associated with a first moment in time and a second integrated 3-D holographic scene image associated with a second moment in time, and wherein all scene images, except for the single 2-D image, in the animated sequence of integrated 3-D holographic scene images are 2-D morphed images.

20. The method of claim 16, further comprising:
generating, by the system, the different depth information and the different disparity information associated with the at least one 2-D morphed image of the at least the one viewing perspective and the first depth information and the first disparity information associated with the at least one 2-D image of the at least one other viewing perspective;
integrating, the different depth information, the different disparity information, the first depth information, and the first disparity information with the at least one 2-D morphed image of the at least the one viewing perspective and the at least one 2-D image of the at least one other viewing perspective; and
generating, by the system, the integrated 3-D holographic scene image comprising at least the at least one 2-D morphed image of the at least the one viewing perspective, the at least one 2-D image of the at least one other viewing perspective, and the different depth information, the different disparity information, the first depth information, and the first disparity information, wherein the integrated 3-D holographic scene image comprises visual quality wherein, when displayed, the integrated 3-D holographic scene image of the segment of the 3-D object scene seamlessly depicts together at least the at least one 2-D morphed image of the at least the one viewing perspective and the at least one 2-D image of the at least one other viewing perspective of the segment of the 3-D object scene.

21. The method of claim 16, further comprising:
identifying, by the system, a subset of fixed points on the at least one 2-D image of the at least the one other perspective of the segment of the 3-D object scene;
identifying, by the system, at least one morph seed point on the at least one 2-D image;
identifying, by the system, at least one morph target point on the at least one 2-D image; and
generating, by the system, the at least one 2-D morphed image of the at least one viewing perspective corresponding to the at least one morph target point, based at least in part on the at least one 2-D image, the at least one morph seed point, and a defined morphing algorithm.

22. The method of claim 16, wherein the at least one 2-D image of the at least one other viewing perspective further comprises a first 2-D image of a first viewing perspective and a second 2-D image of a second viewing perspective of the segment of the 3-D object scene, and wherein the method further comprises:
identifying, by the system, a subset of transition morph points on the first 2-D image of the first viewing perspective of the segment of the 3-D object scene;
identifying, by the system, a subset of corresponding transition morph points in the second 2-D image of the second viewing perspective of the segment of the 3-D object scene;
linking, by the system, respective transition morph points with respective corresponding transition morph points; and
generating, by the system, the at least one 2-D morphed image having the at least one viewing perspective of the segment of the 3-D object scene, based at least in part on the subset of transition morph points, the subset of corresponding transition morph points, and a defined morphing criterion.

23. The method of claim 22, wherein the at least one viewing perspective is a viewing perspective that is in between the first viewing perspective and the second viewing perspective of the segment of the 3-D object scene.

24. The method of claim 16, further comprising:
aerially displaying, by the system, the integrated 3-D holographic image of the segment of the 3-D object scene.

25. A system, comprising:
means for producing a two-dimensional (2-D) morphed image of a viewpoint of a frame of a three-dimensional (3-D) object scene based at least in part on at least one 2-D image of at least one other viewpoint of the frame of the 3-D object scene; and
means for integrating the at least one 2-D image and the 2-D morphed image, based at least in part on holographic data associated with the at least one 2-D image and the 2-D morphed image, to generate an integrated 3-D holographic scene image comprising the viewpoint and the at least one other viewpoint of the frame of the 3-D object scene, wherein the integrated 3-D holographic scene image comprises a first set of depth data and a first set of disparity data associated with the at least one 2-D image of the at least one other viewpoint, and a second set of depth data and a second set of disparity data associated with the 2-D morphed image of the viewpoint.

26. A computer readable storage device comprising computer executable instructions that, in response to execution, cause a system comprising a processor to perform operations comprising:
generating a two-dimensional (2-D) morphed image of a view of a section of a three-dimensional (3-D) object scene based at least in part on at least one 2-D image of at least one other view of the section of the 3-D object scene; and
combining the at least one 2-D image and the 2-D morphed image, based at least in part on holographic data associated with the at least one 2-D image and the 2-D morphed image, to generate an integrated 3-D holographic scene image comprising the view and the at least one other view of the segment of the 3-D object scene, wherein the integrated 3-D holographic scene image comprises first depth information and first disparity information associated with the at least one 2-D image of the at least one other view, and different depth information and different disparity information associated with the 2-D morphed image of the view.

* * * * *